(12) United States Patent
Onishi

(10) Patent No.: US 7,753,274 B2
(45) Date of Patent: Jul. 13, 2010

(54) WRITING INFORMATION PROCESSING DEVICE, WRITING INFORMATION PROCESSING METHOD AND COMPUTER-READABLE MEDIUM

(75) Inventor: Takeshi Onishi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 293 days.

(21) Appl. No.: 11/590,868

(22) Filed: Nov. 1, 2006

(65) Prior Publication Data
US 2007/0241191 A1  Oct. 18, 2007

(30) Foreign Application Priority Data
Apr. 12, 2006  (JP) .............................. 2006-110302

(51) Int. Cl.
G06K 7/00  (2006.01)
G06K 19/06  (2006.01)
G06F 3/033  (2006.01)
(52) U.S. Cl. .................. 235/435; 345/179; 235/494
(58) Field of Classification Search ................ 235/435, 235/375, 454, 494, 462.11, 487; 345/179; 382/187
See application file for complete search history.

(56) References Cited

U.S. PATENT DOCUMENTS

| 6,330,976 | B1 * | 12/2001 | Dymetman et al. | 235/487 |
| 7,331,530 | B2 * | 2/2008 | Mackenzie | 235/494 |
| 7,388,985 | B2 * | 6/2008 | Lapstun et al. | 382/187 |
| 2005/0138541 | A1 * | 6/2005 | Euchner et al. | 715/512 |

FOREIGN PATENT DOCUMENTS

| JP | A-2002-196870 | 7/2002 |
| JP | A-2005-346459 | 12/2005 |
| WO | WO 2005025204 A1 * | 3/2005 |

\* cited by examiner

Primary Examiner—Thien M. Le
Assistant Examiner—Sonji Johnson
(74) Attorney, Agent, or Firm—Morgan, Lewis & Bockius LLP

(57) ABSTRACT

A writing information processing device includes a writing acquiring unit that acquires writing information which is an electrified writing onto a medium that a document image is printed on, a link acquiring unit that acquires at least one of link information to a first electronic document that is an original of the document image and link information to a second electronic document generated from the first electronic document, and a file generating unit that generates a file in which the writing information is added to the link information.

17 Claims, 18 Drawing Sheets

FIG. 3A

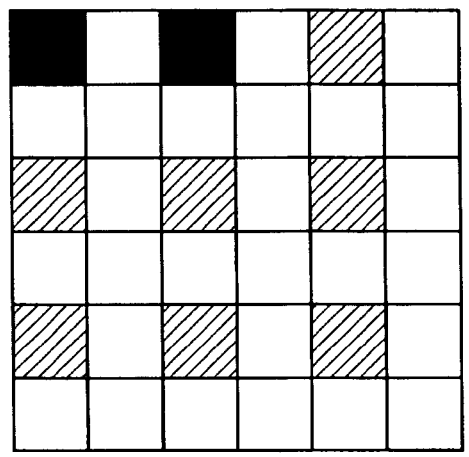

FIG. 3B

| SYNCHRONOUS CODE 2 bit | X-POSITION CODE 5 bit | X-POSITION CODE 5 bit | X-POSITION CODE 5 bit | X-POSITION CODE 5 bit |
|---|---|---|---|---|
| Y-POSITION CODE 5 bit | IDENTIFICATION CODE 5 bit | IDENTIFICATION CODE 5 bit | IDENTIFICATION CODE 5 bit | IDENTIFICATION CODE 5 bit |
| Y-POSITION CODE 5 bit | IDENTIFICATION CODE 5 bit | IDENTIFICATION CODE 5 bit | IDENTIFICATION CODE 5 bit | IDENTIFICATION CODE 5 bit |
| Y-POSITION CODE 5 bit | IDENTIFICATION CODE 5 bit | IDENTIFICATION CODE 5 bit | IDENTIFICATION CODE 5 bit | IDENTIFICATION CODE 5 bit |
| Y-POSITION CODE 5 bit | IDENTIFICATION CODE 5 bit | IDENTIFICATION CODE 5 bit | IDENTIFICATION CODE 5 bit | IDENTIFICATION CODE 5 bit |

FIG. 8A

| IDENTIFICATION INFORMATION | STORAGE PLACE OF ELECTRONIC DOCUMENT | PRINT PARAMETER | FLAG |
|---|---|---|---|
| 00000000001 | server.fujixerox.co.jp/share/aaa.doc | PAGE (1), MARGINS (1, 1, 1, 1), ... | ON |
| 00000000002 | server.fujixerox.co.jp/share/aaa.doc | PAGE (2), MARGINS (1, 1, 1, 1), ... | ON |
| 00000000003 | server.fujixerox.co.jp/share/aaa.doc | PAGE (1), MARGINS (2, 2, 2, 2), ... | OFF |
| 00000000004 | server.fujixerox.co.jp/share/aaa.doc | PAGE (2), MARGINS (2, 2, 2, 2), ... | OFF |
| 00000000005 | server.fujixerox.co.jp/share/bbb.doc | PAGE (1), MARGINS (1, 1, 2, 2), ... | OFF |
| ... | ... | ... | ... |

FIG. 8B

| IDENTIFICATION INFORMATION | STORAGE PLACE OF COPIED DOCUMENT |
|---|---|
| 00000000001 | server.fujixerox.co.jp/user/aaa.xdw#1 |
| 00000000002 | server.fujixerox.co.jp/user/aaa.xdw#2 |
| ... | ... |

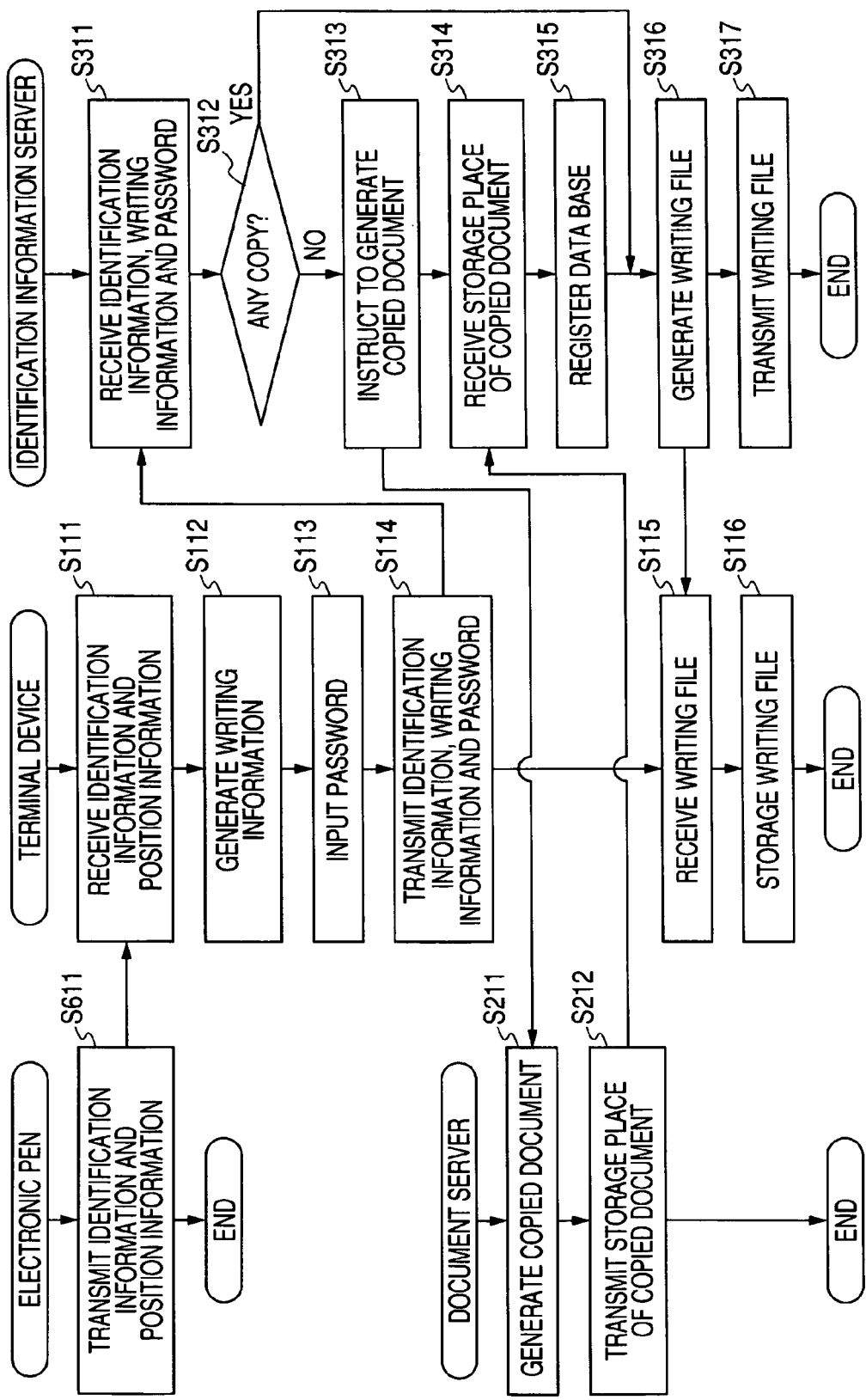

FIG. 15

| IDENTIFICATION INFORMATION | STORAGE PLACE OF ELECTRONIC DOCUMENT | POINTER |
|---|---|---|
| 000000000001 | server.fujixerox.co.jp/so/aaa.xdw | 000000010001 |
| 000000000002 | server.fujixerox.co.jp/so/bbb.xdw | NULL |
| 000000000003 | server.fujixerox.co.jp/so/ccc.xdw | NULL |
| 000000000004 | server.fujixerox.co.jp/so/ddd.xdw | NULL |
| 000000000005 | server.fujixerox.co.jp/so/eee.xdw | NULL |
| ⋮ | ⋮ | ⋮ |
| 000000010001 | server.fujixerox.co.jp/sc/aaa_01.xdw | NULL |
| ⋮ | ⋮ | ⋮ |

WRITING INFORMATION PROCESSING DEVICE, WRITING INFORMATION PROCESSING METHOD AND COMPUTER-READABLE MEDIUM

BACKGROUND (1) Technical Field

The present invention relates to a writing information processing device, a writing information processing method and a computer-readable medium with program (2) Related Art Much attention has been recently paid to a technique in which writing is carried out on the surface of paper or the like with an electronic pen and then the writing is electronized to acquire electronic writing information. In the technique described above, a code pattern inherent to each position on the paper surface is printed on the paper sheet. Accordingly, when writing is carried out on the paper sheet by an electronic pen, the electronic pen reads out the code pattern at the position where the tip of the pen is located and decodes the code pattern, thereby identifying the writing position. Then, writing information is generated from plural identified writing positions.

SUMMARY

According to an aspect of the invention, there is provided a writing information processing device including a writing achieving unit that acquires writing information which is an electrified writing onto a medium that a document image is printed on; a link acquiring unit that acquires at least one of link information to a first electronic document that is an original of the document image and link information to a second electronic document generated from the first electronic document; and a file generating unit that generates a file in which the writing information is added to the link information.

BRIEF DESCRIPTION OF THE DRAWINGS

Exemplary embodiments of the present invention will be described in detail based on the following figures, wherein:

FIGS. 3A and 3B are diagrams showing a code pattern generated in the exemplary embodiment of the present invention;

FIGS. 8A and 8B are diagrams showing examples of the contents of a database used in the first exemplary embodiment of the present invention;

FIG. 9 is a sequence diagram for generation of the writing file in the first exemplary embodiment of the present invention;

FIG. 15 is a diagram showing an example of the content of a database used in the second exemplary embodiment of the present invention;

DETAILED DESCRIPTION

Figure 1:
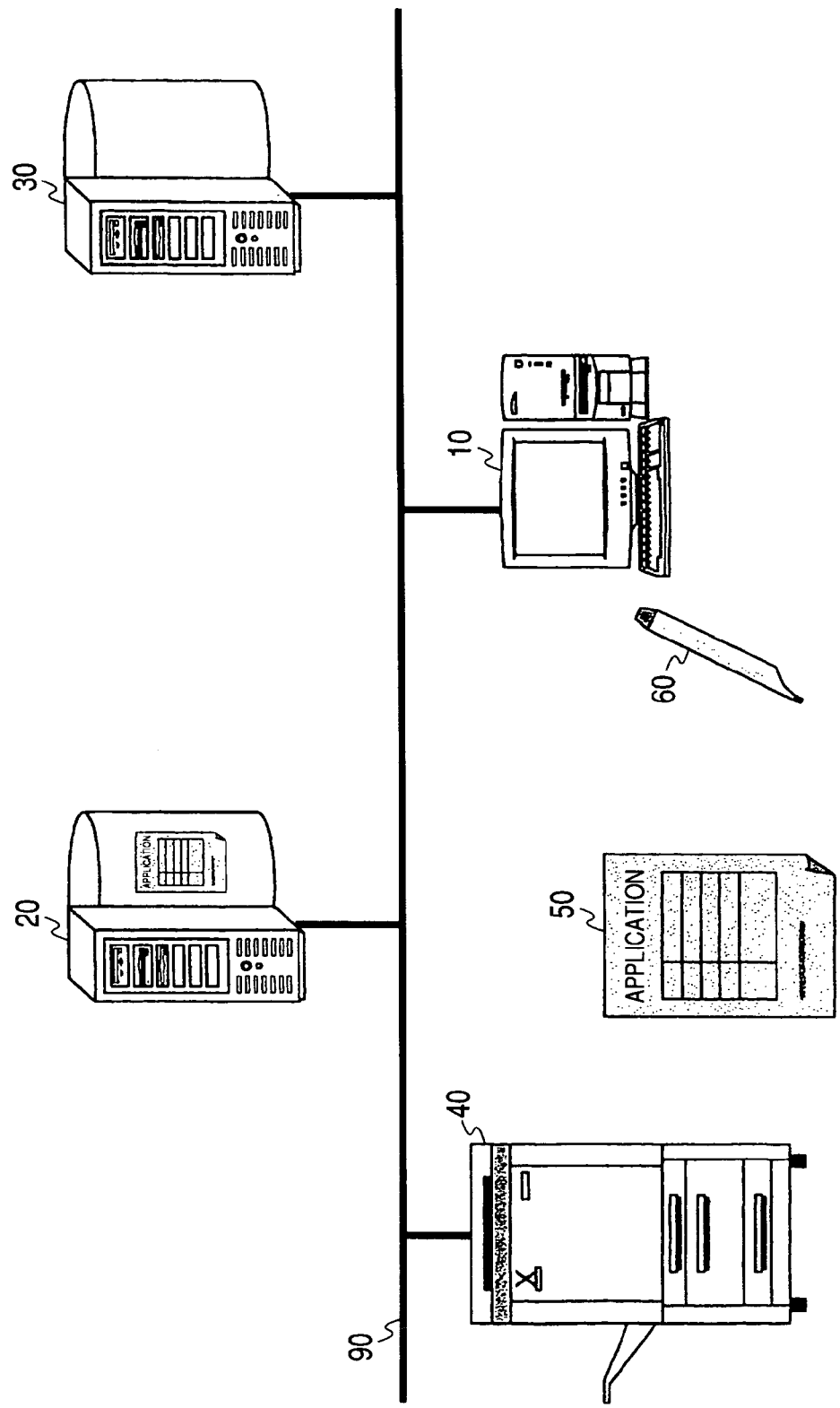
FIG. 1 is a diagram showing the configuration of a system to which a first exemplary embodiment of the present invention is applied.

Exemplary embodiments of the present invention will be described in detail with reference to the accompanying drawings.

According to an exemplary embodiment, a code pattern image as well as a document image of an electronic document is printed on a medium such as paper or the like. The code pattern image is acquired by imaging an identification information code and a position code which are acquired by coding identification information and position information.

Here, either identification information for uniquely identifying a medium or identification information for uniquely identifying an electronic document printed on a medium is adopted as identification information. In the case where the former identification information is adopted, when plural copies of the same electronic document are printed, different identification information is allocated to different media. In the case where the latter identification information is adopted, when the same electronic document is printed, the same identification information is allocated to even different media.

Furthermore, the position information is information indicating the coordinate position on the medium.

According to this exemplary embodiment, by using an electronic pen, writing is carried out on a medium on which such an image is printed, whereby writing information is generated on the basis of position information contained in the code pattern image. Furthermore, an electronic document is specified on the basis of identification information contained in the code pattern image. When the identification information contained in the code pattern image corresponds to the identification information allocated to the medium, the electronic document can be specified by managing the association between the identification information concerned and the electronic document printed on the medium in advance. Then, a file acquired by integrating the writing information with link information to the electronic document thus specified (hereinafter referred to as "writing file") is prepared.

In this specification, the term "electronic document" is used, however, this does not mean only the data acquired by electronizing "document" containing texts. For example, the "electronic document" also contains image data of pictures, photographs, figures, etc. (which are not limited to raster data or vector data), and other printable electronic data. In the aspect of the invention, the term "writing" includes written or handwritten information such as characters, symbols, figures, etc., on a medium such as paper or the like.

Exemplary embodiments for carrying out the operation described above will be schematically described in detail.

As described above, the identification information is classified into identification information for uniquely identifying a medium and identification information for uniquely identifying an electronic document printed on a medium. Therefore, a system using the former identification information will be described as a first exemplary embodiment, and a system using the latter identification information will be described as a second exemplary embodiment.

First Exemplary Embodiment

In this exemplary embodiment, identification information of a medium is embedded in a code pattern image as described above. Therefore, in this exemplary embodiment, "identification information" means the identification information of the medium. For example, when individuals separately write notes, etc. on print documents prepared from the same electronic document, it is convenient to embed different identification information every medium. This is because it is easy to separately manage writing information on media every medium.

Furthermore, if different identification information is embedded every medium, it is of assistance to information tracing. For example, by recording the association between the identification information of a medium and a user instructing the print to the medium concerned, it is possible to easily grasp who outputs a specific print document.

In the following description, the identification information and the position information are used while clearly discriminated from each other in order to simplify the description. However, there is a method of embedding different position information into a code pattern image every medium and identifying the medium on the basis of the difference in position information. Therefore, when such a method is adopted, the position information is regarded as having a medium identifying function, and this information is considered as identification information.

First, the system configuration of this exemplary embodiment will be described.

FIG. 1 shows the configuration of the system to which this exemplary embodiment is applied. The system is configured by connecting a terminal device 10, a document server 20, an identification information server 30 and an image forming device 40 to a network 90. Furthermore, this system contains a print document 50 and an electronic pen 60.

The terminal device 10 is used to instruct print of an electronic document or generate writing information. PC (Personal Computer) may be used as the terminal device 10.

The document server 20 stores electronic documents. When there is a print instruction of an electronic document, an instruction of forming a superposed image of the electronic document and the code pattern is output. Furthermore, in the exemplary embodiment, the document server 20 has also a function of copying an electronic document. The document server 20 can be also implemented by a general-purpose server computer.

The identification information server 30 issues identification information to be allocated to a medium. The issued identification information is managed in association with the electronic document printed on the medium. Furthermore, in this exemplary embodiment, the identification information server 30 has also a function of specifying the electronic document with which the writing information is associated. The identification information server 30 can be also implemented by a general-purpose server computer.

The image forming device 40 forms an image on a medium. Here, for example, an electrophotographic system may be used as an image forming system in the image forming apparatus 40, however, any other system may be used.

The print document 50 is a medium on which the superposed image of the electronic document and the code pattern is printed.

The electronic pen 60 is a pen device having a function of recording characters or figures on the print document 50. In this exemplary embodiment, the electronic pen 60 has also a function of transmitting information acquired from the code pattern image to another device.

The operation of generating the print document 50 in this system will be described.

Figure 2:
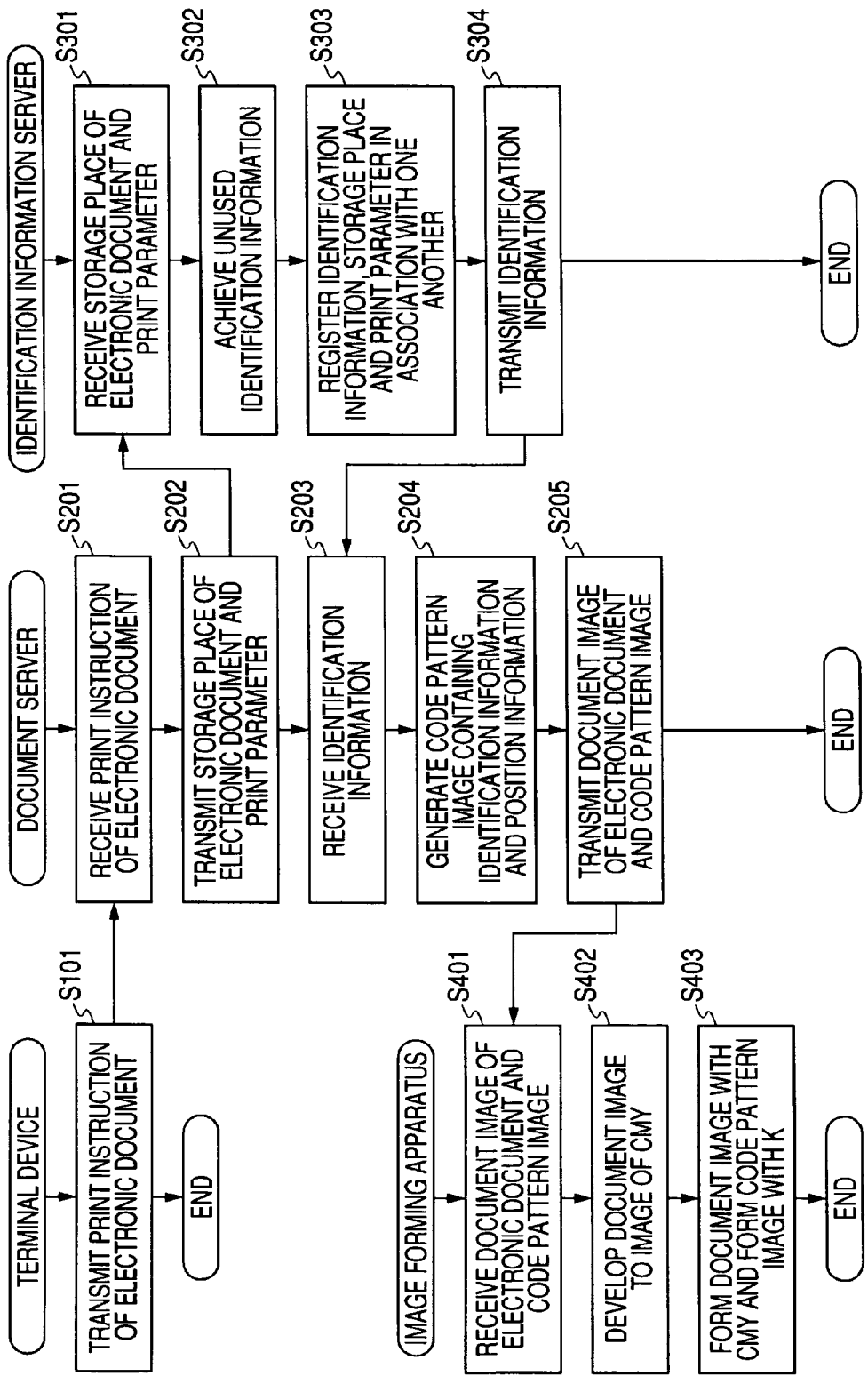
FIG. 2 is a sequence diagram showing generation of a print document in the first exemplary embodiment according to the present invention.

FIG. 2 is a sequence diagram showing the operation.

First, a user operates the terminal device 10, and indicates an electronic document as a print target from the electronic documents stored in the document server 20, whereby the terminal device 10 transmits the print instruction of the electronic document concerned to the document server 20 (step 101). At this time, the terminal device 10 transmits print parameters indicated by the user. The print parameters contains page, number of copies, sheet size, N-up (print of laying out N pages of an electronic document within one page of sheet), margins, etc.

At this time, the document server 20 receives the print instruction of the electronic document (step 201), and transmits the storage place of the electronic document instructed to be printed and the print parameters received from the terminal device 10 to the identification information server 30 (step 202).

Accordingly, the identification information server 30 receives the storage place of the electronic document and the print parameters (step 301). Then, unused identification information is taken out from a database for managing the identification information (step 302). Here, the number of identification information to be taken out is determined in accordance with the print parameters. That is, identification information pieces whose number corresponds to the multiplication of the number of print pages and the number of print copies are basically taken out. However, when there is an indication of N-up or the like in the print parameters, it is also considered. For example, when five copies of an electronic document of 10 pages are printed in 2-up style, identification information pieces whose number is equal to 25 (=10/2×5) are taken out.

Next, the identification information server 30 registers the identification information, the storage place of the electronic document and the print parameters in association with one another into the database (step 303). The identification information server 30 transmits the identification information to the document server 20 (step 304).

Accordingly, the document server 20 receives the identification information (step 203), and generates a code pattern image in which the identification information and the position information are embedded (step 204). The details of the processing of generating the code pattern image will be described later.

Thereafter, the document server 20 transmits the document image of the electronic document and the code pattern image to the image forming apparatus 40, and instructs to form an image (step 205). This instruction may be carried out by generating a page description language (PDL) from the electronic document, the identification information and the position information and transmitting the page description language.

The image forming apparatus 40 receives the document image of the electronic document and the code pattern image (step 401). The image forming apparatus 40 first develops the document image to images of C (cyan), M (magenta) and Y (yellow) (step 402). Subsequently, the document image is subjected to image formation by using toner of C, M and Y, and the code pattern image is subjected to image formation by using toner of K (black) (step 403).

In the above example, the identification information server 30 merely issues the identification information, and the document server 20 generates the code pattern image containing the identification information and instructs the image formation to the image forming apparatus 40. However, the identification information server 30 may generate code pattern image and instruct the image formation to the image forming apparatus 40.

Furthermore, the code pattern image may be generated in the image forming apparatus 40. In this case, the document server 20 or the identification information server 30 adds the identification information to PDL generated from the electronic document and transmits it to the image forming apparatus 40, and the image forming apparatus 40 generates the code pattern image containing the identification information.

In the foregoing exemplary embodiment, the configuration is explained as follows, the database in which the identification information, the storage place of the electronic document and the print parameters are stored in association with one another is placed in the identification information managing server 30. This is because it is possible to provide services to plural users and ensure safety of electronic documents based on a server access control technique by placing the database in a sharable device. However, the configuration as described above is not necessarily required to be adopted, and such a database may be placed in the terminal device 10 or the document server 20.

In the foregoing exemplary embodiment, the code pattern image is formed by using toner of K. This is because the toner of K absorbs a larger amount of infrared ray than toner of C, M, Y, and the code pattern image can be read by the electronic pen 60. However, the code pattern image may be formed by specific toner.

Here, as the specific toner may be used invisible toner having the maximum absorption factor of 7% or less in the visible light region (400 nm to 700 nm) and the absorption factor of 30% or more in the near-infrared ray region (800 nm to 1000 nm). Here, "visible" and "invisible" are not dependent on whether an object is recognizable by visual observation. The discrimination between "visible" and "invisible" is based on whether an image formed on a printed medium is recognizable or not on the basis of coloring or non-coloring which is caused by absorption of a specific wavelength in the visible light region. Furthermore, a situation under which an object has slight coloring caused by absorption of a specific wavelength in the visible light region, but it is hardly recognizable by human eyes is also contained in "invisible".

Furthermore, it is desirable that the invisible toner has an average dispersion particle of 100 nm to 600 nm in order to enhance the near-infrared absorption performance required to mechanically read images.

Next, a code pattern serving as an original of the code pattern image generated in this exemplary embodiment will be described.

FIG. 3 is a diagram showing the code pattern.

First, a bit pattern constituting the code pattern will be described.

FIG. 3A shows an example of the arrangement of the bit pattern.

The bit pattern is the minimum unit of embedding of information. In this case, bits are arranged at two places selected from nine places as shown in FIG. 3A. In FIG. 3A, black squares indicate positions at which bits are arranged, and shaded squares indicate positions at which no bit is arranged. The number of combinations to select two places from nine places is equal to 36 ($=_9C_2$). Accordingly, 36 information pieces (about 5.2 bits) which correspond to the 36 combinations can be represented by the arranging method as described above.

However, it is assumed that the identification information and the position information are represented by using 32 combinations (5 bits) out of the 36 combinations.

The minimum square shown in FIG. 3A has the size of 2 dots×2 dots in 600 dpi. The size of one dot in 600 dpi is equal to 0.0423 mm, and thus one side of the minimum square is equal to 84.6 µm (=0.0423 mm×2). The dots constituting the code pattern are more conspicuous as the size of each dot is increased, and thus it is desirable that the size of the dot is as small as possible. However, if the size is excessively reduced, these dots cannot be printed by a printer. Therefore, any value in the range from not less than 50 µm to not more than 100 µm, for example, the above value is adopted as the size of the dot. Accordingly, the dots having the optimum size which can be printed by a printer can be formed. That is, the minimum size at which the dots can be stably formed by a printer is equal to 84.6 µm×84.6 µm.

By setting the size of the dots to the value as described above, one side of one bit pattern is equal to about 0.5 (=0.0423×2×6) mm.

Next, a code pattern including such a bit pattern as described above will be described.

FIG. 3B shows an example of the arrangement of the code pattern.

Here, the minimum square shown in FIG. 3B corresponds to the bit pattern shown in FIG. 3A. That is, an identification information code acquired by coding identification information is embedded by using 16 (=4×4) bit patterns. Furthermore, each of an X-position code acquired by coding the position information in the X direction and a Y-position code acquired by coding the position information in the Y direction is embedded by using four bit patterns. Furthermore, a synchronous code for detecting the position and rotation of the code pattern is embedded at the upper left corner by using one bit pattern.

The size of one code pattern is equal to the width of five bit patterns, and thus it is equal to 2.5 mm. In this exemplary embodiment, the thus-generated code pattern is imaged to acquire a code pattern image, and then the code pattern image is disposed on the whole surface of a sheet.

Subsequently, the processing of coding the identification information and the position information and generating the code pattern image from the coded information will be described. In the case of the system described with reference to FIG. 1, this processing is executed by the document server 20.

Figure 4:
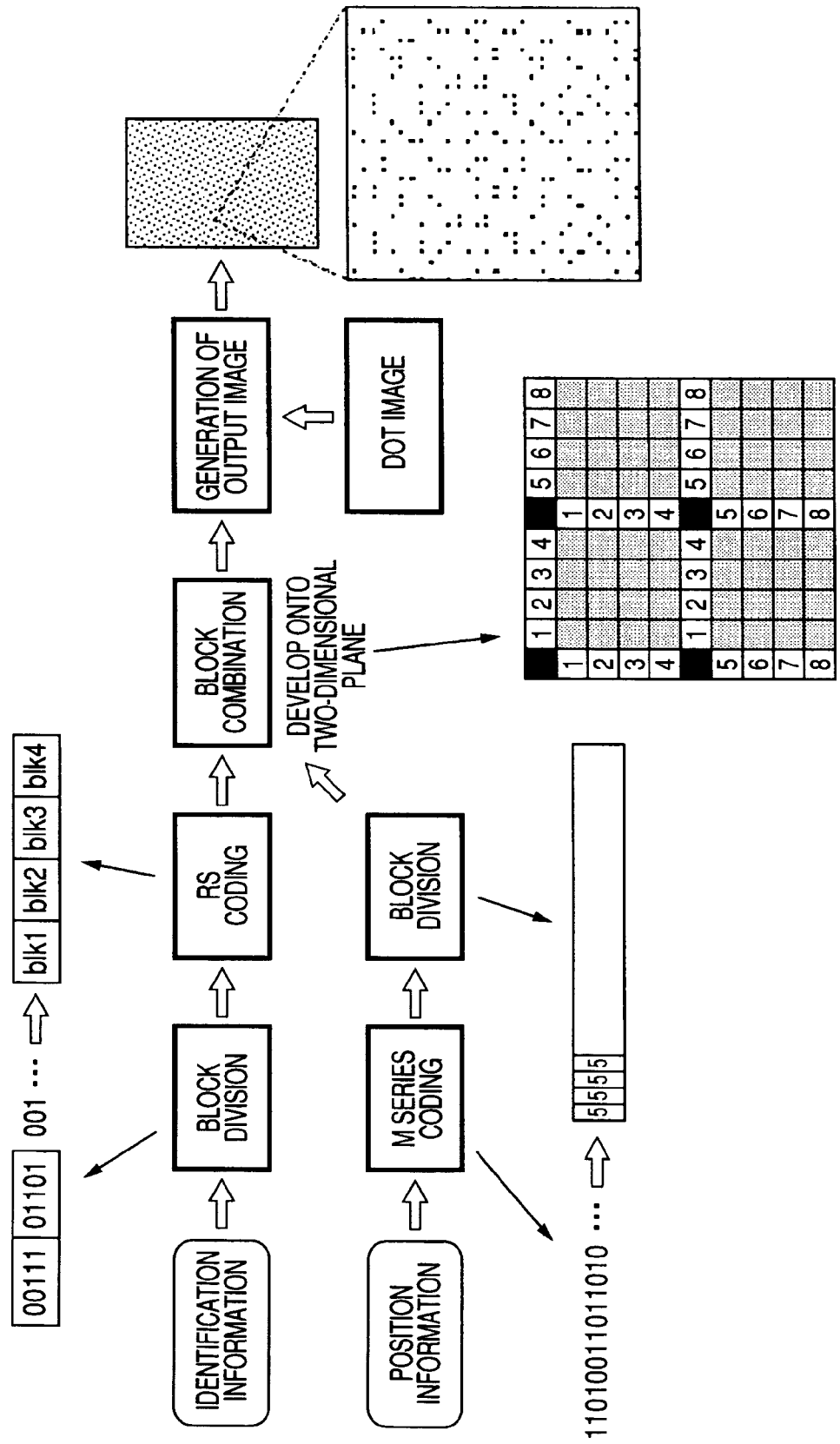
FIG. 4 is a diagram showing coding of information and generation of a code pattern image in the exemplary embodiment of the present invention.

FIG. 4 is a diagram showing the coding and image generating processing as described above.

First, the coding of the identification information will be described.

RS (Reed Solomon) coding based on a block coding system is used for the coding of the identification information. As described with reference to FIG. 3, according to this exemplary embodiment, information is embedded by using a bit pattern which can represent 5-bit information. Accordingly, an error of information occurs on a 5-bit basis, and thus the RS coding is used because it has a better coding efficiency in the block coding system. However, the coding system is not limited to the RS coding, and other coding systems such as BCH coding, etc. may be used.

According to this exemplary embodiment, information is embedded by using a bit pattern having an information amount of 5 bits as described above. Accordingly, it is required to set the block length of the RS coding to 5 bits. Therefore, the identification information is sectioned every 5 bits to be blocked. In FIG. 4, a first block "00111" and a second block "01101" are cut out from the identification information "0011101101001 . . . ".

The blocked identification information is subjected to the RS coding processing. In FIG. 4, blocking is carried out like "blk1", "blk2", "blk3", "blk4", . . . , and then the RS coding is carried out.

In this exemplary embodiment, the identification information is divided into 16 (=4×4) blocks. Therefore, the number of coded blocks in the RS coding can be set to 16. Furthermore, the number of information blocks can be designed in accordance with an error occurrence status. For example, when the number of information blocks is equal to 8, the code is RS(16, 8) code. With respect to this code, even when an error of four blocks (=(16−8)/2) occurs in the coded information, it can be corrected. Furthermore, if the position of the error can be specified, the correcting performance can be further enhanced. In this case, the amount of information stored in the information blocks is equal to 40 bits (=5 bits×8 blocks). Accordingly, $10^{12}$ kinds of identification information can be represented.

Next, the coding of the position information will be described.

An M-series coding which is one type of pseudorandom number sequence is used for the coding of position information. Here, the M series is defined as series having the maximum period which occur in a linear shift register of K stages, and it has a series length of $2^K-1$. Any sequential K bits taken out from the M series have a property that they do not appear at other positions in the same M series. Therefore, by utilizing this property, the position information can be coded.

In this exemplary embodiment, the order of the necessary M series is determined on the basis of the length of the position information to be coded, and then the M series is generated. However, when the length of the position information to be coded is known in advance, it is not necessary to generate the M series every time. That is, fixed M-series may be generated in advance, and stored in a memory or the like.

For example, it is assumed that M-series of a series length 8191 (K=13) is used. In this case, the position information is also embedded on a 5-bit basis, and thus every five bits are taken out from the M-series of the series length 8191 for blocking. In FIG. 4, the M series "11010011011010 . . . ." is blocked every five bits.

In this exemplary embodiment, the position information and the identification information are coded by using the different coding systems as described above. This is because it is required that the detection performance of the identification information is set to be higher than the detection performance of the position information. That is, the position information is the information to acquire the position on the surface of paper, and thus even when there is any portion which cannot be decoded due to noise or the like, only the portion concerned is defective and the other portions are not influenced. On the other hand, if decoding of the identification information fails, a target reflecting writing information could not be detected.

Furthermore, by constructing the position information and the identification information as described above, an image reading range when the position information and the identification information are decoded can be minimized. That is, when a coding system having boundaries such as RS coding or the like is used for the position information, it is required to read the code between the boundaries when the coded position information is decoded. Therefore, it is required that an area which is twice as large as the area shown in FIG. 3B is provided as an image reading range. However, by using the M series, an area having the same size as the area shown in FIG. 3B may be set as an image reading range. This is because the property of the M series enables the position information to be decoded from any partial series of the M series. That is, when the identification information and the position information are decoded, it is required to read the area having the size shown in FIG. 3B. However, it is unnecessary to make the reading position coincident with the boundary shown in FIG. 3B. The position information can be decoded from partial series at any position of the M series.

With respect to the identification information, the same information is arranged on the whole surface of paper. Therefore, even when the reading position is displaced from the boundary shown in FIG. 3B, the original information can be decoded by re-arranging fragments of the read information.

As described above, when the identification information is coded by RS coding after it is divided into blocks and the position information is divided into blocks after it is coded by M series, the blocks are combined as shown in FIG. 4. That is, these blocks are developed onto the two-dimensional plane as a format shown in FIG. 4. The format shown in FIG. 4 corresponds to the format shown in FIG. 3B. That is, the black square means the synchronous code. Furthermore, "1", "2", "3", "4", . . . arranged in the lateral direction mean the X-position codes, and "1", "2", "3", "4", . . . arranged in the longitudinal direction means the Y-position codes. With respect to the position information, when the position of the medium is different, different information is disposed, and thus it is indicated by the numeral value corresponding to the coordinate position. On the other hand, a gray square means an identification information code. With respect to the identification information code, the same information is disposed even when the position of the medium is different, and thus all the identification information codes are indicated by the same mark.

As is apparent from FIG. 4, four bit patterns exist between two synchronous codes. Accordingly, a partial series of M series of 20 (=5×4) bits can be disposed. By taking out a partial series of 13 bits from the partial series of 20 bits, it can be specified which partial series in the whole portion (8191) corresponds to 13 bits. As described above, when 13 bits out of 20 bits are used to specify the position, detection or correction of an error of the 13 bits is carried out by using the remaining 7 bits. That is, the consistency of 20 bits is checked by using the same generator polynomial as when the M series is generated, whereby the error detection and correction can be performed.

Thereafter, the bit pattern in each block is imaged by referring to a dot image. Then, an output image representing information by dots as shown at the rightmost side of FIG. 4 is generated.

Next, generation and use of a writing file in this system will be described.

First, an electronic pen 60 used to read writings on the print document 50 will be described.

Figure 5:
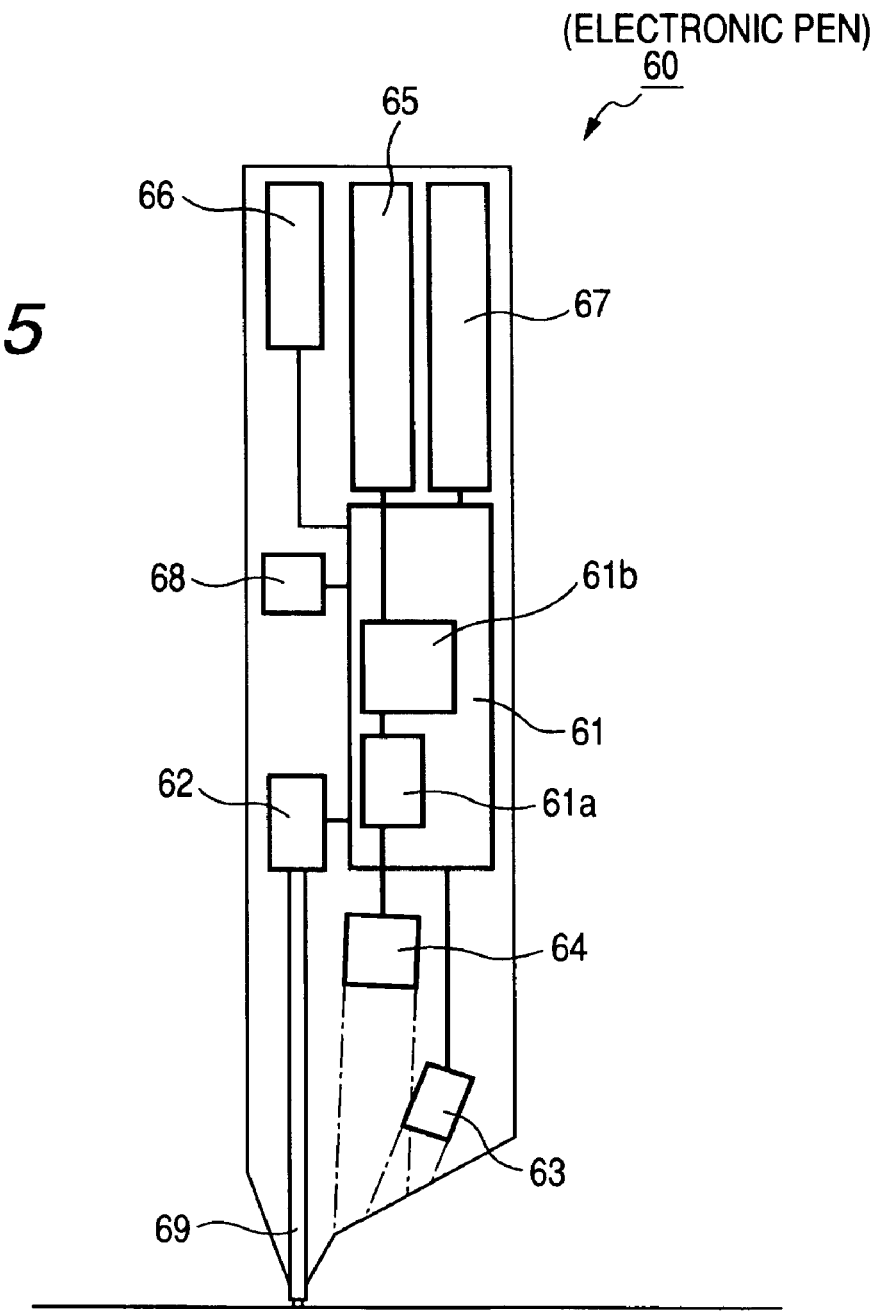
FIG. 5 is a diagram showing the mechanism of an electronic pen in the exemplary embodiment of the present invention.

FIG. 5 is a diagram showing the mechanism of the electronic pen 60.

As shown in FIG. 5, the electronic pen 60 is equipped with a control circuit 61 for controlling the operation of the whole of the pen. The control circuit 61 contains an image processor 61*a* for processing a code pattern image detected from an input image and a data processor 61*b* for extracting identification information and position information from the processing result concerned.

The control circuit 61 is connected to a pressure sensor 62 for detecting the writing operation of the electronic pen 60 on the basis of the pressure applied to a pen chip 69. Furthermore, the control circuit 61 is connected to infrared LED 63 for irradiating infrared light onto a medium and infrared CMOS 64 for inputting an image. Still furthermore, the control circuit 61 is connected to an information memory 65 for storing identification information and position information, a communication circuit 66 for communicating with an external device, a battery 67 for driving the pen, and a pen ID memory 68 for storing identification information (pen ID) of the pen.

Here, the operation of the electronic pen 60 will be briefly described.

When writing is carried out by the electronic pen 60, the pressure sensor 62 connected to the pen chip 69 detects the writing operation, whereby the infrared LED 63 is turned on, and the infrared CMOS 64 picks up the image on the medium by a CMOS sensor.

The infrared LED 63 is turned on in a pulse style in synchronism with the shutter timing of the CMOS sensor in order to control power consumption.

Furthermore, a global shutter type CMOS sensor which can transmit a pickup image at the same time is used as the infrared CMOS 64. A CMOS sensor having sensitivity in the infrared region is used. In order to reduce the influence of the external disturbance, a visible light cut filter is disposed on the whole surface of the CMOS sensor. The CMOS sensor picks up images at a period of about 70 fps to 100 fps (frame per second). The image pickup element is not limited to the CMOS sensor, and CCD and other image pickup devices may be used.

When the pickup image is input to the control circuit 61, the control circuit 61 acquires a code pattern image from the pickup image. The code pattern image is decoded to acquire identification information and position information embedded in the code pattern image.

The operation of the control circuit 61 at this time will be described.

Figure 6:
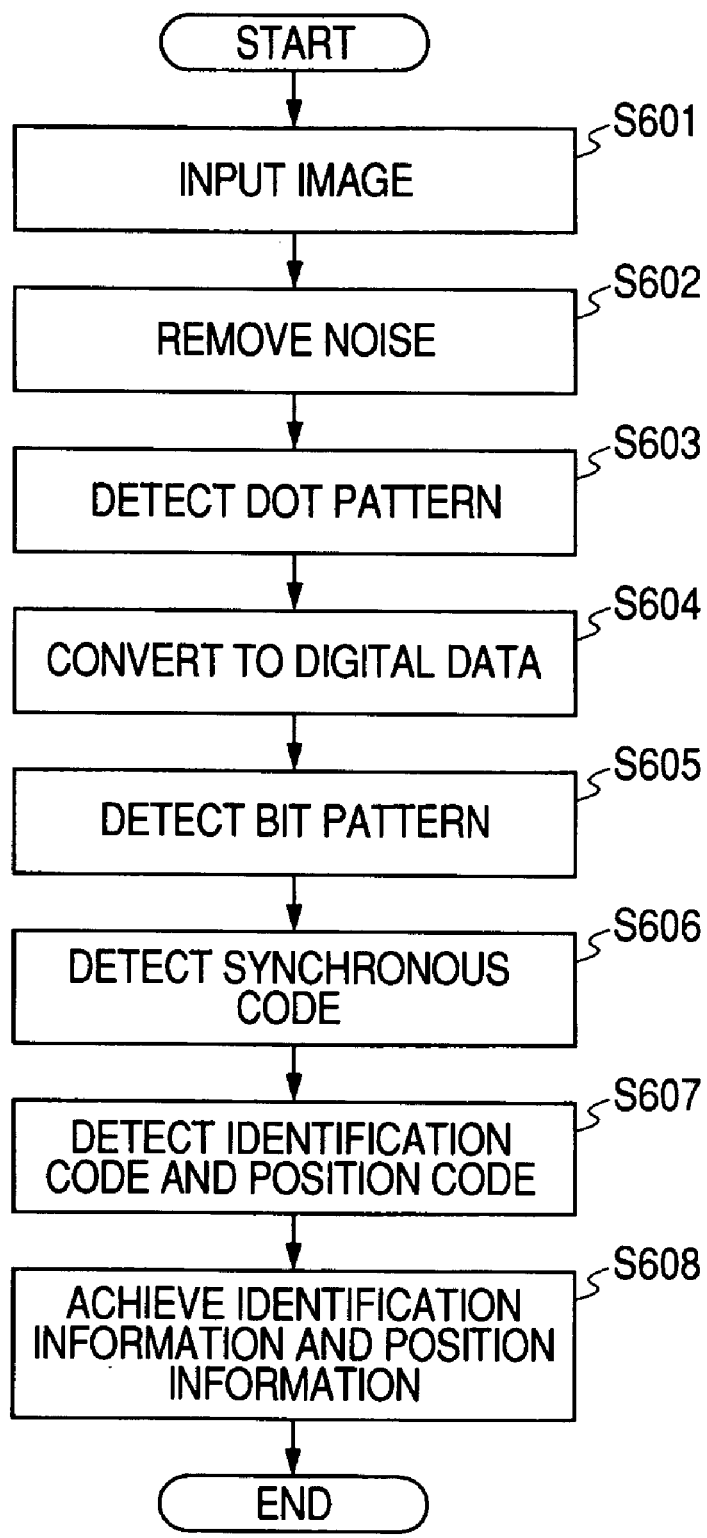
FIG. 6 is a flowchart showing the operation of an electronic pen in the exemplary embodiment of the present invention.

FIG. 6 is a flowchart showing the operation of the control circuit 61.

First, the image processor 61*a* inputs an image (step 601), and executes the processing of removing noises contained in the image (step 602). Here, the noises contain dispersion of CMOS sensitivity, noises induced by the electronic circuit, etc. The processing to be executed in order to remove the noises should be determined in accordance with the characteristic of the image pickup system of the electronic pen 60. For example, blurring processing, radicalization processing such as unsharp masking or the like may be applied.

Subsequently, the image processor 61*a* detects a dot pattern (the position of the dot image) from the image (step 603). For example, the image is sectioned into a dot pattern portion and a background portion by the binarization processing, and the dot pattern can be detected from individual binary image positions. When many noise components are contained in the binary image, it is required to use the filter processing of judging the dot pattern on the basis of the area or shape of the binary image in combination.

Furthermore, the image processor 61*a* converts the detected dot pattern to digital data on the two-dimensional arrangement (step 604). For example, the dot pattern is converted so that on the two-dimensional arrangement, a position at which a dot exists is "1" and a position at which no dot exists is "0". The digital data on the two-dimensional arrangement is delivered from the image processor 61*a* to the data processor 61*b*.

Subsequently, the data processor 61*b* detects the bit pattern including the combination of two dots shown in FIG. 3A from the delivered digital data (step 605). For example, the boundary position of the block corresponding to the bit pattern is moved on the two-dimensional arrangement, and such a boundary position that the number of dots contained in the block is equal to two is detected, whereby the bit pattern can be detected.

When the bit pattern is detected as described above, the data processor 61*b* checks the type of the bit pattern to detect the synchronous code (step 606). Then, the identification information code and the position code are detected on the basis of the position relationship from the synchronous code (step 607).

Thereafter, the data processor 61*b* decodes the identification information code to acquire the identification information, and decodes the position code to acquire the position information (step 608). With respect to the identification information code, the identification information is acquired by conducting the RS decoding processing. On the other hand, with respect to the position code, the position of the read partial series is compared with the M series used when the image is generated, thereby achieving the position information.

Next, the processing of generating the writing file and the processing of using the writing file will be described. The former processing is the processing of generating writing information from the information acquired by the electronic pen 60 and adding the writing information to link information to an electronic document. The latter processing is the processing of achieving the electronic document on the basis of the link information by operating the writing file. This processing is implemented by information exchange among the terminal device 10, the document server 20 and the identification information server 30.

Figure 7:
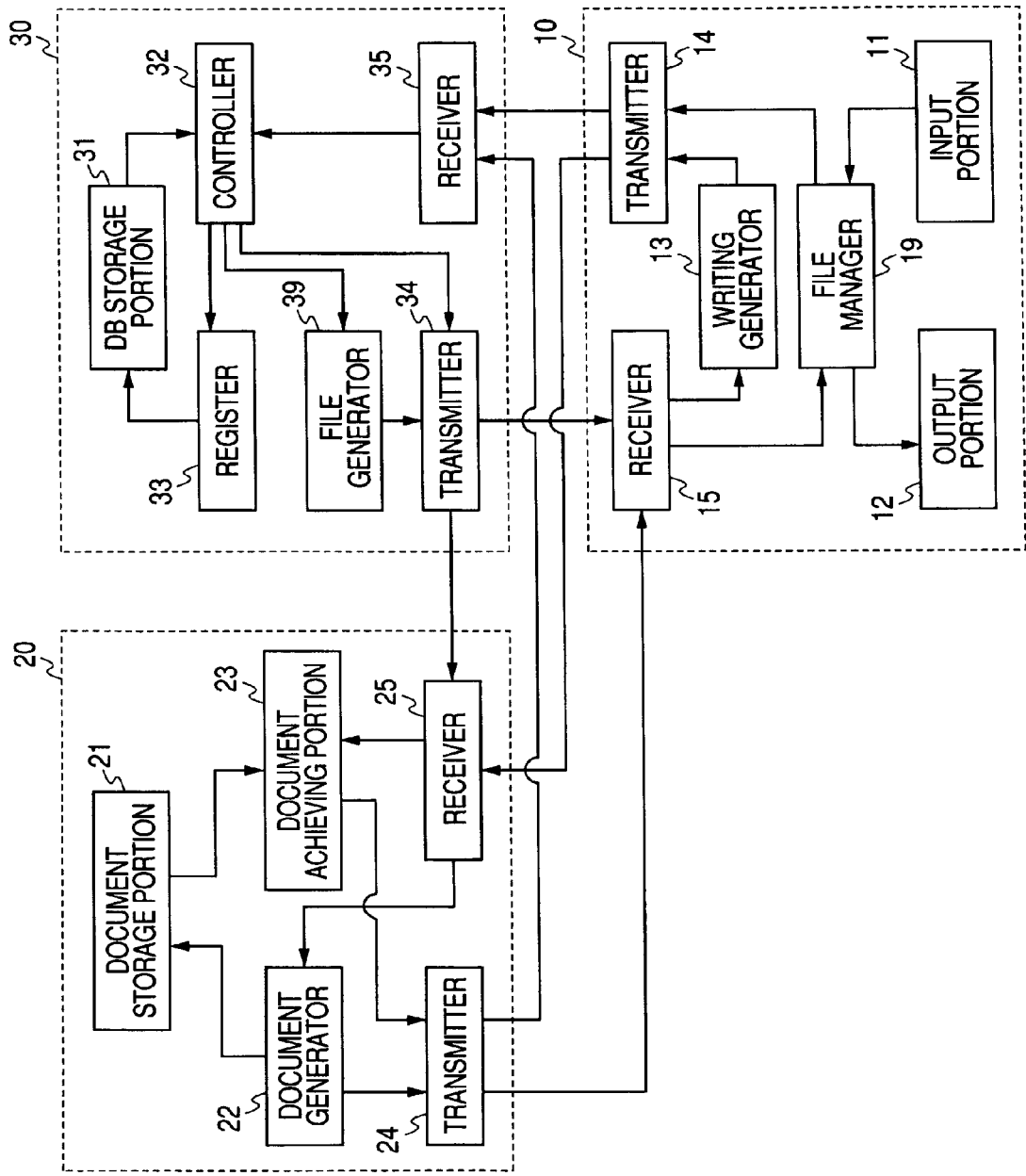
FIG. 7 is a block diagram showing the configurations of a terminal device, a document server and an identification information server for generation and use of a writing file in the first exemplary embodiment of the present invention.

FIG. 7 is a diagram showing the functional configuration of the terminal device 10, the document server 20 and the identification information server 30. The terminal device 10, the document server 20 and the identification information server 30 have the function of generating the print document 50, however, in the following description, only the function of generating and using the writing file is shown.

As shown in FIG. 7, the terminal device 10 is equipped with an input part 11, an output part 12, a writing generator 13, a transmitter 14, a receiver 15 and a file managing part 19.

The input part 11 inputs a password, etc. set for a writing file, and the output part 12 outputs an electronic document, etc. acquired by operating the writing file. The writing generator 13 generates writing information on the basis of position information acquired by the electronic pen 60. The transmitter 14 transmits the identification information, the writing information, the password, etc. to the identification information server 30, and transmits a request for achieving an electronic document to the document server 20. The receiver 15 receives the identification information and the position information from the electronic pen 60, receives the writing file from the identification information server 30 and also receives the electronic document from the document server 20. The file manager 19 stores the writing file in a storage device (not shown) and manages it.

The writing generator 13 generates the writing information, and thus it functions as a writing information achieving unit.

These functional portions are implemented by the cooperation of software and hardware resources. Specifically, CPU (not shown) of the terminal device 10 reads programs for implementing the respective functions of the input part 11, the output part 12, the writing generator 13, the transmitter 14, the receiver 15 and the file manager 19 from an external storage device to a main storage device to execute the processing. Furthermore, the storage device for storing the writing file managed by the file manager 19 may be implemented by a magnetic disk, for example.

Furthermore, the document server 20 is equipped with a document memory 21, a document generator 22, a document achieving part 23, a transmitter 24 and a receiver 25.

The document memory 21 stores an electronic document. The document generator 22 generates a new electronic document (hereinafter referred to as "copy document") by copying the electronic document stored in the document memory 21, and stores the copy document into the document memory 21. The document achieving part 23 reads the electronic document stored in the document memory 21. The transmitter 24 transmits the electronic document to the terminal device 10, and also transmits the generation result of the copy document to the identification information server 30. The receiver 25 receives a request for achieving the electronic document from the terminal device 10, and also receives an instruction of generating the copy document from the identification information server 30.

These functional parts are implemented by the cooperation of the software and hardware resources. Specifically, CPU (not shown) of the document server 20 reads programs for implementing the respective functions of the document generator 22, the document achieving part 23, the transmitter 24 and the receiver 25 from the external storage device to the main storage device to execute the processing. Furthermore, the document memory 21 is implemented by a magnetic disk, for example.

Furthermore, the identification information server 30 is equipped with a DB (database) memory 31, a controller 32, a register 33, a transmitter 34, a receiver 35 and a file generator 39.

The DB memory 31 stores a database in which the identification information, the storage place of the electronic document, the print parameters and the flag indicating whether any copy document exists or not are associated with one another. The controller 32 controls the operation of the whole identification information server 30, and the register 33 registers information into the database stored in the DB memory 31. The transmitter 34 transmits the writing file to the terminal device 10, and transmits the instruction of generating the copy document to the document server 20. The receiver 35 receives the identification information, the writing information, the password, etc. from the terminal device 10, and receives the generation result of the copy document from the document server 20. The file generator 39 generates the writing file.

The transmitter 34 executes the processing of generating the copy document, and thus it functions as a document generating unit. Furthermore, the receiver 35 receives the writing information, and thus it functions as a writing information achieving unit. In addition, the receiver 35 receives link information to the electronic document as the generation result of the copy document, and thus it functions as a link achieving unit.

These functional portions are implemented by the cooperation of software and hardware resources. Specifically, CPU (not shown) of the identification information server 30 reads programs for implementing the respective functions of the controller 32, the register 33, the transmitter 34, the receiver 35 and the file generator 39 from the external storage device to the main storage device for processing. The DB memory 31 is implemented by a magnetic disk, for example.

Next, the content of the database stored in the DB memory 31 in the identification information server 30 will be described.

FIGS. 8A and 8B show examples of the data in the database. Specifically, FIG. 8A shows a table for managing an electronic document printed in each medium. As shown in FIG. 8A, the identification information, the storage place of the electronic document, the print parameters and the flag are provided as items in the table.

In this exemplary embodiment, the identification information is the identification information of each medium as described above. The storage place of the electronic document is the information of a place (address) at which the electronic document printed on each medium is stored. The print parameters are set when the electronic document is printed on each medium. In FIG. 8A, each print parameter is indicated in the format "page (P), margins (A, B, C, D)". P represents a page number, and A, B, C, D represent margins of left side, right side, upper side and lower side (unit is mm). In this case, the page and the margin are provided as the print parameter, however, the present invention is not limited to these parameters. Various kinds of print parameter which are normally used for print may be used and managed.

The flag indicates whether a copy document is generated from the electronic document printed on each medium. In this exemplary embodiment, the flag "ON" indicates that a copy document is generated, and the flag "OFF" indicates that no copy document is generated. Immediately after data are registered in step 303 of FIG. 2, the corresponding flag is set to an initial value "OFF". However, when a copy document is afterwards generated by making writing on the print document 50, the flag is set to "ON".

The database shown in FIG. 8A will be more specifically described.

First, it is indicated from first to fourth lines that two copies of first and second pages of an electronic document "aaa.doc" are printed. At that time, one copy is printed under the condition that the right and left margins and the upper and lower margins are set to 1 mm, and the other copy is printed under the condition that the right and left margins and the upper and lower margins are set to 2 mm.

Furthermore, it is indicated from the fifth line that one copy of a first page of an electronic document "bbb.doc" is printed. At that time, the right and left margins are set to 1 mm, and the upper and lower margins are set to 2 mm.

The flags from the third to the fifth line out of the first to fifth lines are set to "OFF", and thus the original electronic document is not copied. On the other hand, the flags from the first and second lines are set to "ON". This indicates that a medium managed by the first line or a medium managed by the second line is subjected to writing and thus the original electronic document "aaa.doc" thereof is copied.

According to this exemplary embodiment, when the copy document of the original electronic document is generated as described above, the copy document is managed by another table.

FIG. 8B shows the table for managing such a copy document. That is, a first page of a copy document "aaa.xdw" to "aaa.doc" is associated with the medium to be managed by the first line of FIG. 8A. Furthermore, a second page of the copy document "aaa.xdw" to "aaa.doc" is associated with the medium to be managed by the second line of FIG. 8A.

In this case, an example is shown as follows, the copy documents of the electronic document managed by the first and second lines of FIG. 8A are managed in the table of FIG. 8B. However, this does not mean that writing is actually carried out on both the media managed by the first and second lines of FIG. 8A. When writing is carried out on some medium, a copy document for the whole original electronic document may be generated. Out of the original electronic document, a copy document for only the page printed on the medium may be generated.

Next, the operation when the writing file is generated will be described.

FIG. 9 is a sequence diagram showing the operation at this time.

First, the electronic pen 60 transmits the identification information and the position information acquired through the processing of FIG. 6 to the terminal device 10 (step 611).

In the terminal device 10, the receiver 15 receives the identification information and the position information, and delivers these information to the writing generator 13 (step 111).

Subsequently, the writing generator 13 generates writing information on the basis of the position information out of the delivered information, and delivers the writing information to the transmitter 14 (step 112). At this time, the writing information is generated on the basis of the position information indicating plural positions on the medium.

When the position information received from the electronic pen 60 contains an error, the writing generator 13 may execute the following processing to correct the position information.

First, the processing is the filter processing of comparing plural position information pieces with one another and removing singular points in these position information pieces. That is, the continuity of the plural position information pieces acquired through one writing operation (stroke) is investigated, and points which are greatly displaced from the continuity are removed as points at which decoding errors occurred. Accordingly, smooth writing information can be acquired.

Secondly, the processing is the correction processing of detecting position information whose decoding fails, and correcting the position information concerned on the basis of surrounding position information. That is, by investigating the continuity of plural position information pieces acquired through one writing operation (stroke), a decoding error is detected. Position information whose decoding fails is corrected by using position information which is around the position information concerned and whose decoding succeeds. As the correction method may be used well-known interpolation methods such as linear interpolation, spline interpolation, etc.

Furthermore, the writing generator 13 directly delivers the identification information received from the receiver 15 to the transmitter 14.

At this time, the input part 11 inputs a password set to the writing file (step 113). For example, the terminal device 10 displays a dialog box on a display (not shown) in accordance with generation of the writing information. The user may input a password into the dialog box, whereby the input part 11 inputs the password. The input password is delivered to the file manager 19, and after it is subjected to encryption processing in the file manager 19 and then delivered to the transmitter 14.

Thereafter, the transmitter 14 transmits the identification information, the writing information and the password to the identification information server 30 (step 114).

In the identification information 30, the receiver 35 receives the identification information, the writing information and the password, and delivers them to the controller 32 (step 311). The controller 32 refers to the database stored in the DB memory 31, and judges whether the flag corresponding to the received identification information is set to "ON" (step 312). That is, it is judged whether writing is carried out beforehand on the same medium and thus a copy document of an electronic document printed on the medium concerned has been already generated.

Here, if it is judged that the flag is set to "OFF", that is, it is judged there is no copy document, the controller 32 instructs the transmitter 34 to transmit to the document server 20 an instruction of generating a copy document of the original electronic document. The transmitter 34 instructs the document server 20 to generate a copy document (step 313). For example, when writing is carried out on the medium managed by the third line of FIG. 8A, generation of a copy document of "aaa.doc" is instructed.

Accordingly, in the document server 20, the receiver 25 receives this instruction, and delivers it to the document generator 22. The document generator 22 generates a copy document of an indicated electronic document out of the electronic documents stored in the document memory 21, and stores it into the document memory 21 (step 211).

At this time, the controller 32 of the identification information server 30 acquires the print parameters associated with the medium in the database of the DB memory 31. The transmitter 34 transmits the print parameters to the document server 20. Accordingly, the document generator 22 of the document server 20 can generate the copy document which looks like the print document. As a result, the reflection of the writing information to the electronic document is carried out with higher precision.

Furthermore, when the electronic document is edited, the corresponding relationship between the electronic document and the writing information is lost, and inconsistency may occur. Furthermore, some electronic documents do not have any page structure corresponding to the print document like a Web page or the like, and the layout of the print document may be greatly varied in accordance with the setting at the print time. In such a case, the writing information can be reflected to the proper position by generating the electronic document having the same layout as the print data.

At this time, the copy document may be formatted so that the portion corresponding to the original electronic document cannot be edited. "XDW format" in "DocuWorks" of Fuji Xerox Co., Ltd., "PDF format" in "Acrobat" of Adobe Systems of USA, etc. are known as the format for the copy document. When a copy document formatted so that the portion corresponding to the original electronic document cannot be edited as described above is generated, a writing file which enables attachment of writing information to a copy document can be generated, for example, by using the function of "annotation" in "DocuWorks" of Fuji Xerox Co., Ltd.

When the copy document is generated as described above, the document generator 22 acquires information on the storage place of the copy document (containing the file name), and delivers the information concerned to the transmitter 24. Then, the transmitter 24 transmits this information to the identification information server 30 (step 212).

Accordingly, in the identification information server 30, the receiver 35 receives the information on the storage place of the copy document, and delivers the information concerned to the register 33 through the controller 32 (step 314). The register 33 stores the association between the identification information and the storage place into the DB memory 31. Furthermore, the flag corresponding to the original electronic document as the copy source is changed to "ON" (step 315). For example, when writing is carried out on the medium immediately after the first line of FIG. 8A is registered, the first line of FIG. 8B is registered at this time. The flag of the first line of FIG. 8A is changed from "OFF" to "ON".

Thereafter, the file generator 39 generates a writing file (step 316). Furthermore, when it is judged that the flag is set to "ON" in step 312, that is, when it is judged that there is a copy document, the file generator 39 generates a writing file without instructing to generate any copy document (step 316). The detailed content of the writing file will be described later, however, it contains at least a password, link information to the copy document and writing information.

Then, the file generator 39 delivers the writing file to the transmitter 34, and the transmitter 34 transmits the writing file to the terminal device 10 (step 317).

Accordingly, in the terminal device 10, the receiver 15 receives the writing file (step 115). The receiver 15 delivers the writing file to the file manager 19, and the file manager 19 manages the writing file in a storage device (not shown) (step 116)

Here, the writing file generated through the above processing will be described.

Figure 10:
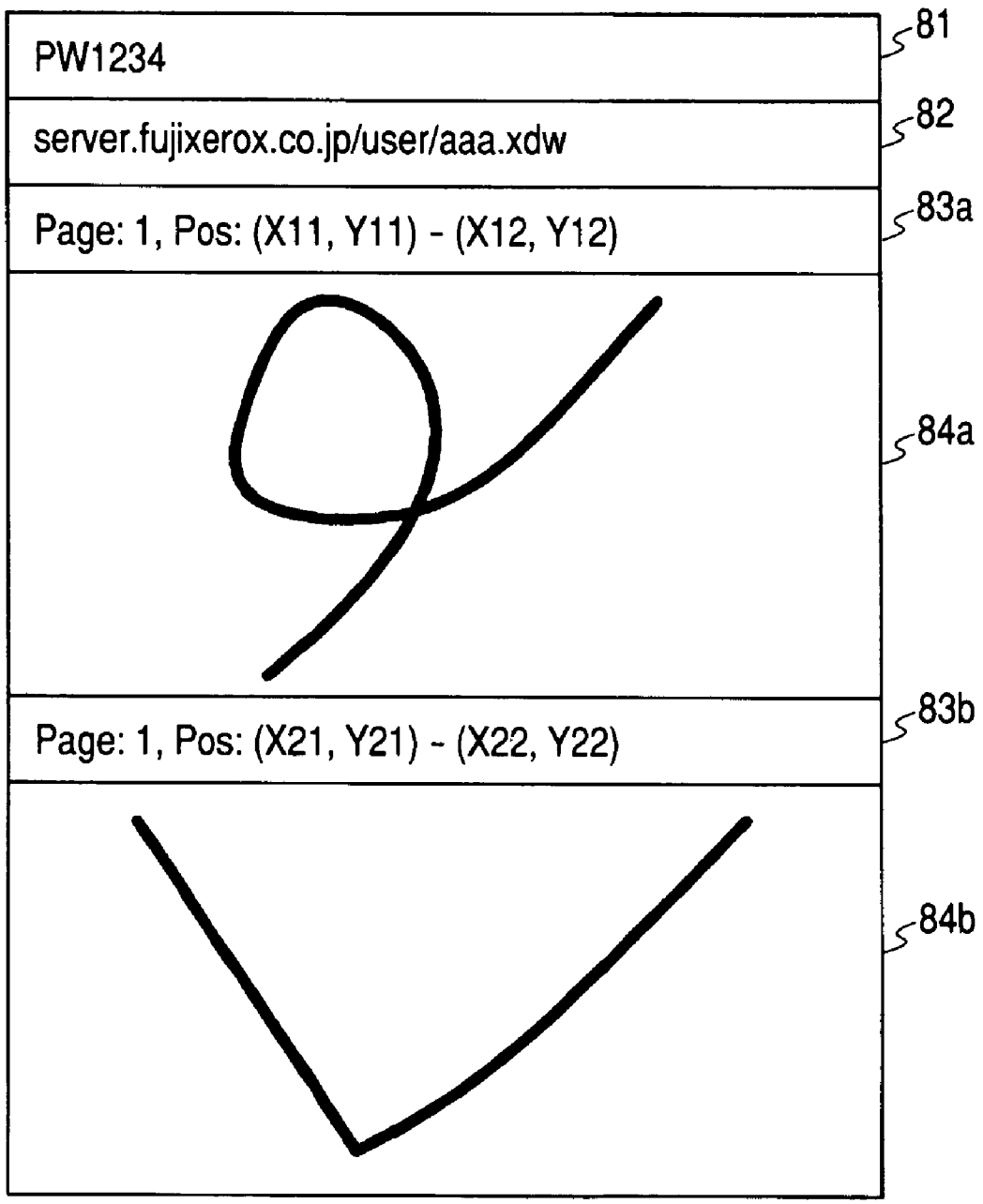
FIG. 10 is a diagram showing an example of the writing file generated in the first exemplary embodiment of the present invention.

FIG. 10 is a diagram showing an example of the writing file. In this case, FIG. 10 shows an example of the writing file generated when writing is carried out on the medium managed by the first line of FIG. 8A.

As shown in FIG. 10, the writing file has a password area 81, a link information area 82, position information areas 83a and 83b and writing information areas 84a and 84b.

The password set in step 311 is set in the password area 81. In this case, "PW1234" is set as a password.

In the link information area 82 is set link information to the copy document specified in step 312 or received in step 314. In this case, since it is assumed that writing is carried out on the medium managed by the first line of FIG. 8A, the address information of "aaa.xdw" at the first line of FIG. 8B is set.

Positions on the electronic document at which the writing information is attached are set in the position information areas 83a and 83b, and the writing information attached at the positions set in the position information areas 83a and 83b is set in the writing information areas 84a and 84b.

Normally, the electronic document includes plural pages. Therefore, in this exemplary embodiment, page numbers and coordinates in the pages are set at the writing information attaching positions in the position information areas 83a and 83b. In this case, the first page of the electronic document is printed on the medium managed by the first line of FIG. 8A, and thus the page numbers in the position information areas 83a and 83b are set to "1". Furthermore, it is set in the position information area 83a that the writing information is attached as an annotation in a rectangular area where the upper left point is set to (X11, Y11) and the lower right point is set to (X12, Y12). Furthermore, it is also set in the position information area 83b that the writing information is attached as an annotation in a rectangular area where the upper left point is set to (X21, Y21) and the lower right point is set to (X22, Y22).

In this case, the coordinate in the page is contained in the position information, however, this is not indispensable. That is, when the writing information is managed so that over-lay display can be made on the whole of the page, it is unnecessary to hold the coordinates in the writing file.

Next, the operation of achieving the electronic document by operating the writing file as described above and displaying the acquired electronic document while superposing the writing information on the electronic document will be described.

Figure 11:
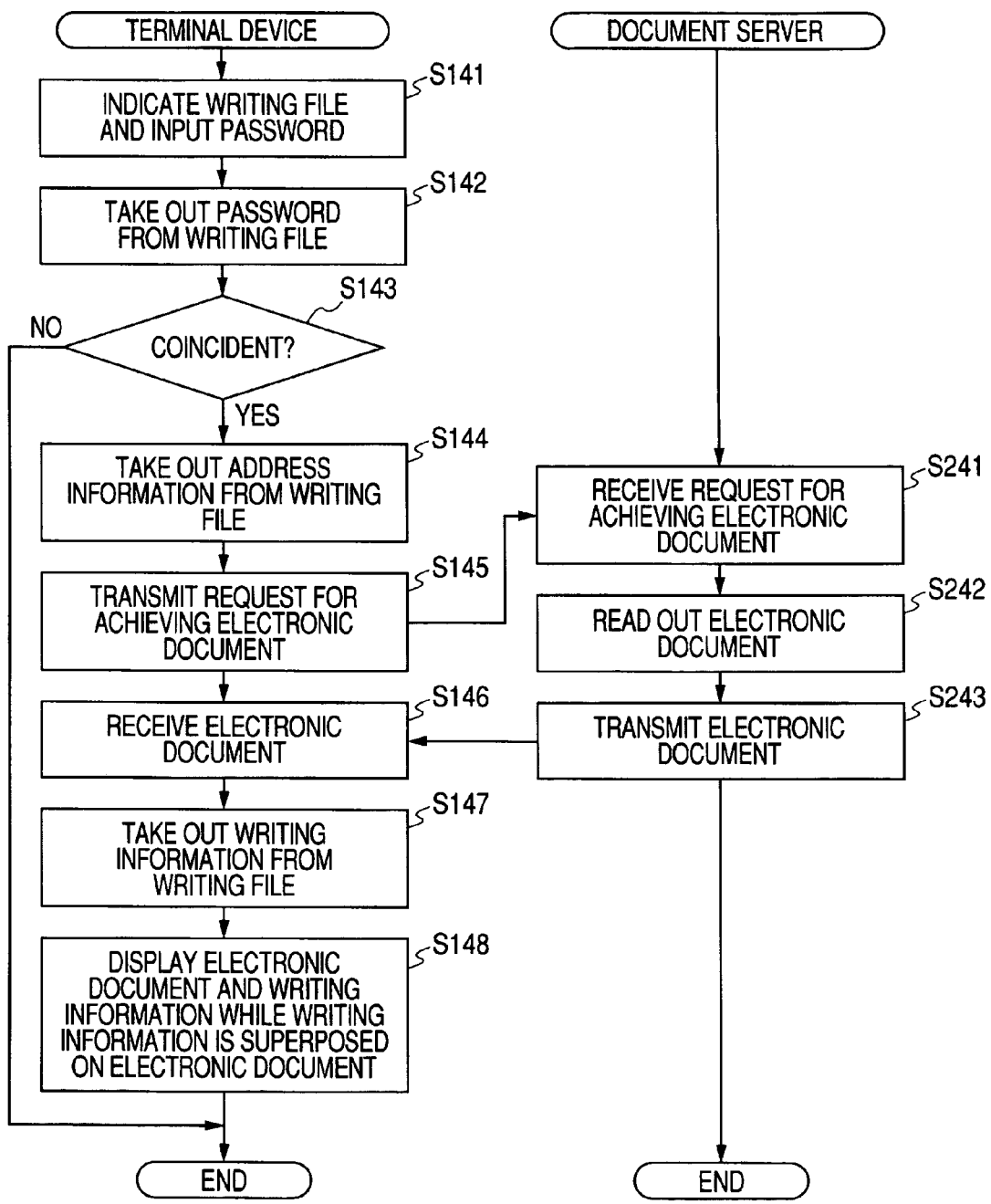
FIG. 11 is a sequence diagram for use of the writing file in the first exemplary embodiment of the present invention.

FIG. 11 is a flowchart showing the operation concerned.

In the terminal device 10, the input part 11 inputs information indicating a writing file and a password, and delivers them to the file manager 19 (step 141). For example, the user selects a desired writing file from a list of writing files managed by the file manager 19, and the input part 11 inputs the selected information. Subsequently, the terminal device 10 displays a dialog box on the display (not shown). Then, the user may input a password into the dialog box, whereby the input part 11 inputs the password.

Subsequently, the file manager 19 takes out the password from the indicated writing file out of the writing files stored in the storage device (not shown) (step 142), and then it is judged whether the input password is coincident with the password taken out from the writing file (step 143).

Here, if both the passwords are not coincident with each other, it is considered that a user having no authority to use the writing file operates the terminal device 10, and thus the processing ends. On the other hand, if both of the passwords are coincident with each other, it is considered that a user having authority to use the writing file operates the terminal device 10, thus the processing continues. That is, the file manager 19 takes out address information from the writing file, and delivers it to the transmitter 14 (step 144). Then the transmitter 14 transmits to the document server 20 a request for achieving the electronic document from the storage place indicated by the address information (step 145).

Accordingly, in the document server 20, the receiver 25 receives the achieving request, and delivers it to the document achieving part 23 (step 241). The document achieving part 23 reads out the requested electronic document from the document memory 21, and delivers it to the transmitter 24 (step 242).

Thereafter, the transmitter 24 transmits the delivered electronic document to the terminal device 10 (step 243).

Accordingly, in the terminal device 10, the receiver 15 receives the electronic document and delivers it to the file manager 19 (step 146). The file manager 19 takes out the writing information from the writing file specified in step 141 (step 147). The take-out writing information is superposed on the electronic document delivered in step 146 to generate a superposition image, and the generated superposition image is delivered to the output part 12. The output part 12 displays the superposition image on the display (not shown) (step 148).

In the foregoing description, when a copy document is generated because writing is carried out beforehand on the same medium, new writing information is added to the link information to the existing copy document to generate a writing file. However, many variations may be considered for the above method.

First, there is a method of inquiring of the user for determination about which electronic document should be selected to add new writing information to the link information to the selected electronic document. Alternatively, when it has been already determined at the print time which electronic document should be selected to add the new writing information to the link information to the selected electronic document, indication information for indicating the electronic document to be selected may be embedded as a part of the code pattern image in the medium. In this case, when the electronic pen 60 acquires the identification information and the position information from the code pattern image, the electronic pen 60 also acquires this indication information, and transmits it to the identification information server 30. Then, in the identification information server 30, the link information to the electronic document specified on the basis of the indication information is added with the writing information to generate the writing file.

Furthermore, in this exemplary embodiment, address information is set as link information, however, document ID may be set as the link information. The document ID is identification information which is not associated with the storage place of an electronic document and also can uniquely specify the electronic document as described in a second exemplary embodiment. Accordingly, in this case, when the user operates the writing file, the identification information managing server 30 transmits the address information corresponding to the document ID to the terminal device 10, and the terminal device 10 accesses a target electronic document on the basis of the address information.

Furthermore, the copy document is generated from the original electronic document and the writing information is added to the link information to the copy document until now. However, the writing information may be added to the link information to the original electronic document to generate the writing file.

As described above, according to this exemplary embodiment, the link information to the electronic document and the writing information are unified to generate the writing file. With this configuration, the convenience when the writing information is treated can be enhanced. That is, each individual who writes some information to a print document derived from an electronic document enables to manage his/her writing information by himself/herself. Therefore, the user can treat electronized writing information as if the user treats paper.

Furthermore, the association between the electronic document and the writing information is not managed by the server. Accordingly, the writing information can be moved on a file basis without any complicate management in the server. That is, information sharing based on copies and electronic mails can be easily performed. In addition, no complicated management in the server is required, and thus the processing load of the server can be reduced.

Still furthermore, the configuration that the writing information is held in the server and the configuration that the writing information can be pursued from the information managed in the server are not adopted. Accordingly, writing information which is not desired to be laid open can be easily made secret. In addition, the access to electronic documents is controlled in the server level (or file level), however, the access to writing information is controlled in the file level. Accordingly, even when a user having no authority to access an electronic document acquires a writing file, an unauthorized access to the electronic document can be prevented by the access control function of the server because the entity of the electronic document is stored in the server. Furthermore, flexible security to writing information can be ensured.

Second Exemplary Embodiment

In this exemplary embodiment, as described above, the identification information of the electronic document is embedded in the code pattern image. Therefore, in this exemplary embodiment, "identification information" means the identification information of an electronic document. It would be convenient if identification information of each electronic document is embedded in such a case that writing information is afterwards integrated with plural print documents prepared from the same electronic document such as a questionnaire. Furthermore, even when the number of identification information pieces is small and thus there are fears of depletion of identification information, it is also desirable to adopt identification information every electronic document.

The file name of the electronic document or information on the storage place may be considered as the identification information of the electronic document. In this exemplary embodiment, however, "document ID" provided separately from the file name of the electronic document and the information on the storage place is assumed as the identification information of the electronic document. When an electronic document includes plural pages, it is desirable to embed the page numbers in combination with the document ID. However, in order to simplify the description, the page is left out of consideration.

First, the system configuration in this exemplary embodiment will be described.

Figure 12:
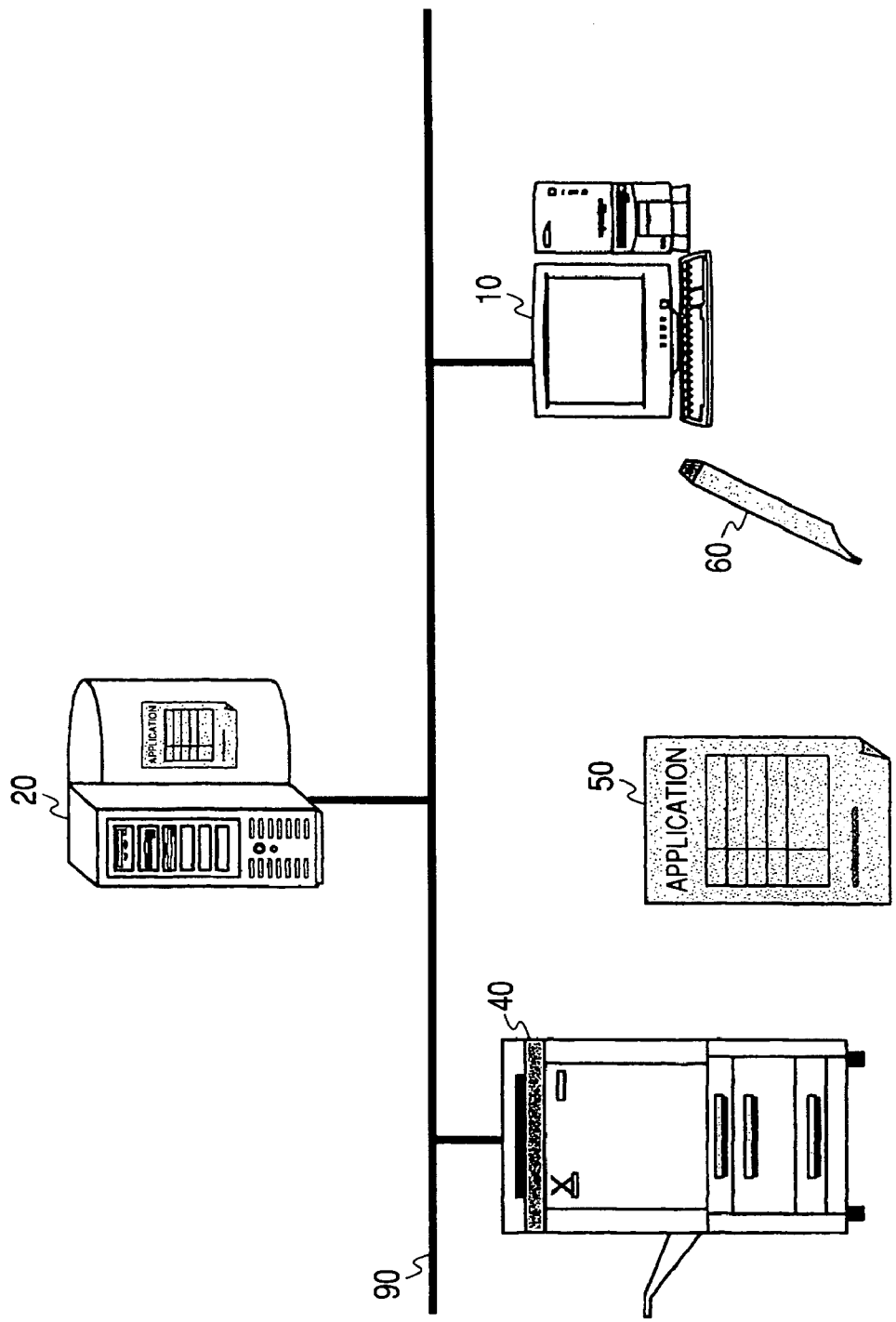
FIG. 12 is a diagram showing the configuration of a system to which a second exemplary embodiment of the present invention is applied.

FIG. 12 shows the configuration of the system to which this exemplary embodiment is applied. This system is configured by connecting a terminal device 10, a document server 20 and an image forming apparatus 40 to a network 90. This system also contains a print document 50 and an electronic pen 60.

The system configuration of the second exemplary embodiment is different from the system configuration of the first exemplary embodiment only in that the identification information server 30 does not exist. That is, in the first exemplary embodiment, identification information to be allocated to each medium is assumed as identification information to be embedded in each medium. Accordingly, the identification information server 30 is especially provided for managing the identification information to be allocated to each medium so that the identification information is not overlapped. However, in the second exemplary embodiment, the identification information is the identification information of the electronic document. In this case, it is natural that the document server 20 managing the electronic document also manages the identification information, and thus the identification information server 30 is not provided.

The respective constituent elements of this system are the same as the first exemplary embodiment, and thus the description thereof is omitted.

Next, the operation of generating the print document 50 in this system will be described.

Figure 13:
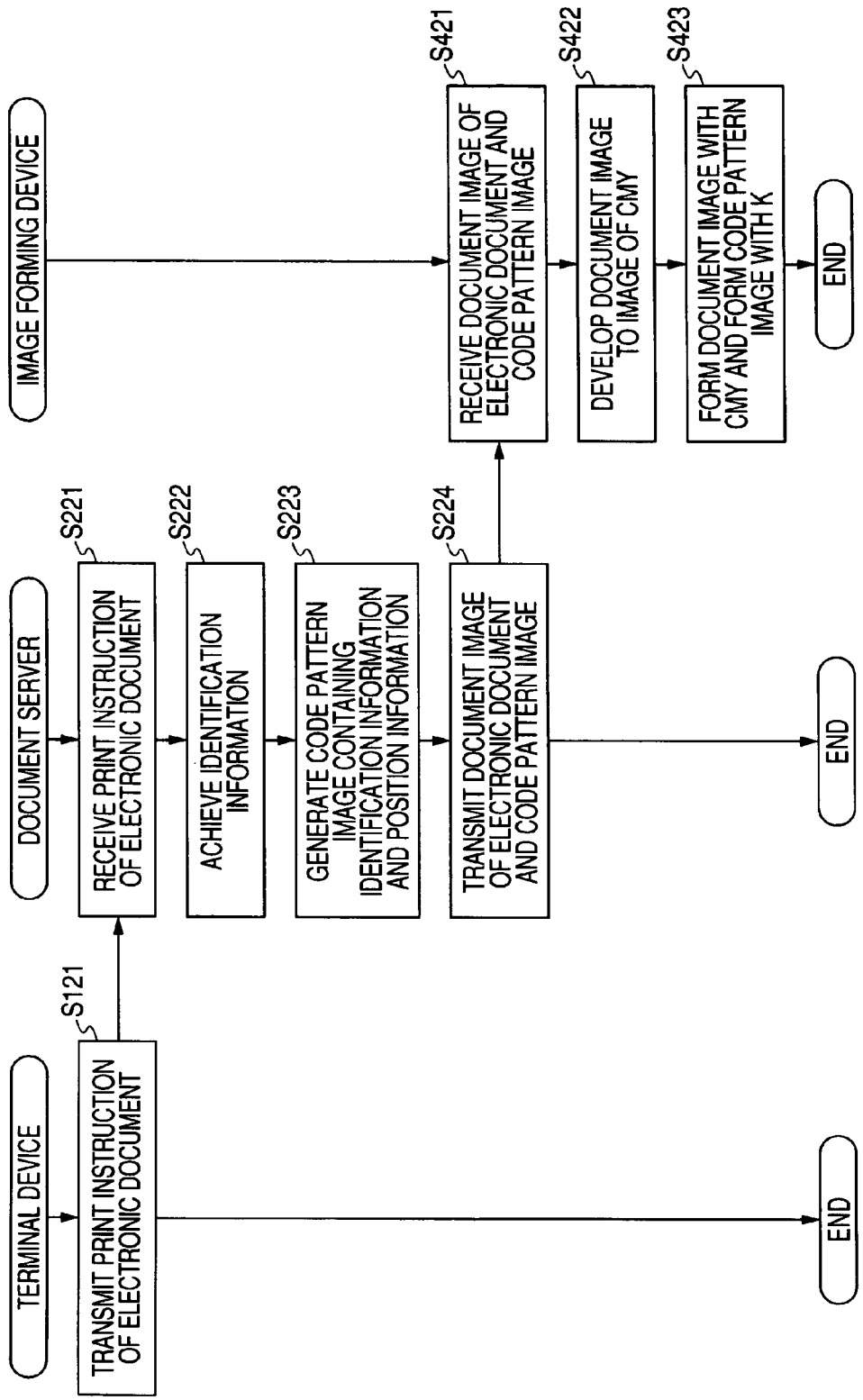
FIG. 13 is a sequence diagram showing generation of a print document in the second exemplary embodiment of the present invention.

FIG. 13 is a sequence diagram showing this operation.

First, the user operates the terminal device 10 to indicate an electronic document as a print target from the electronic documents stored in the document server 20, whereby the terminal device 10 transmits the print instruction of the electronic document concerned to the document server 20 (step 121).

The document server 20 receives the print instruction of the electronic document (step 221), and acquires the identification information of the electronic document concerned (step 222). Then, it generates a code pattern image in which the identification information and the position information are embedded (step 223). The generation of the code pattern image is the same as the first exemplary embodiment.

Thereafter, the document server 20 transmits the document image of the electronic document and the code pattern image to the image forming apparatus 40, and instructs to generate an image (step 224). This instruction may be performed by generating a page description language (PDL) from the electronic document, the identification information and the position information, and transmitting PDL.

Accordingly, the image forming apparatus 40 receives the document image of the electronic document and the code pattern image (step 421). The image forming apparatus 40 first develops the document image into images of C (cyan), M (magenta) and Y (yellow) (step 422). Subsequently, the image is formed by applying toner of C, M and Y to the document image and applying toner of K (black) to the code pattern image (step 423).

In the foregoing example, the document server 20 generates the code pattern image containing the identification information. However, the code pattern image may be also generated in the image forming apparatus 40. In this case, the document server 20 adds the identification information to PDL generated from the electronic document and transmits it to the image forming apparatus 40. The image forming apparatus 40 generates the code pattern image containing the identification information.

In the foregoing example, the code pattern image is formed by using toner of K. This is because the toner of K has a higher absorption amount of infrared ray than toner of C, M, Y and thus the code pattern image can be read by the electronic pen 60. However, the code pattern image may be formed by using special toner. The details of the special toner are the same as the first exemplary embodiment.

Furthermore, the code pattern serving as an original of a code pattern image generated in this exemplary embodiment is the same as the first exemplary embodiment, and thus the description thereof is omitted.

Next, the generation and use of the writing file in this system will be described.

First, the electronic pen 60 used to read writings on the print document 50 is identical to that of the first exemplary embodiment in mechanism and operation, and thus the description thereof is omitted.

Next, the processing of generating the writing file and the processing of using the writing file will be described. In the former processing, writing information is generated from information acquired from the electronic pen 60, and added to link information to an electronic document. In the latter processing, by operating the writing file, the electronic document is acquired on the basis of the link information. These processing is implemented by the exchange of information between the terminal device 10 and the document server 20.

Figure 14:
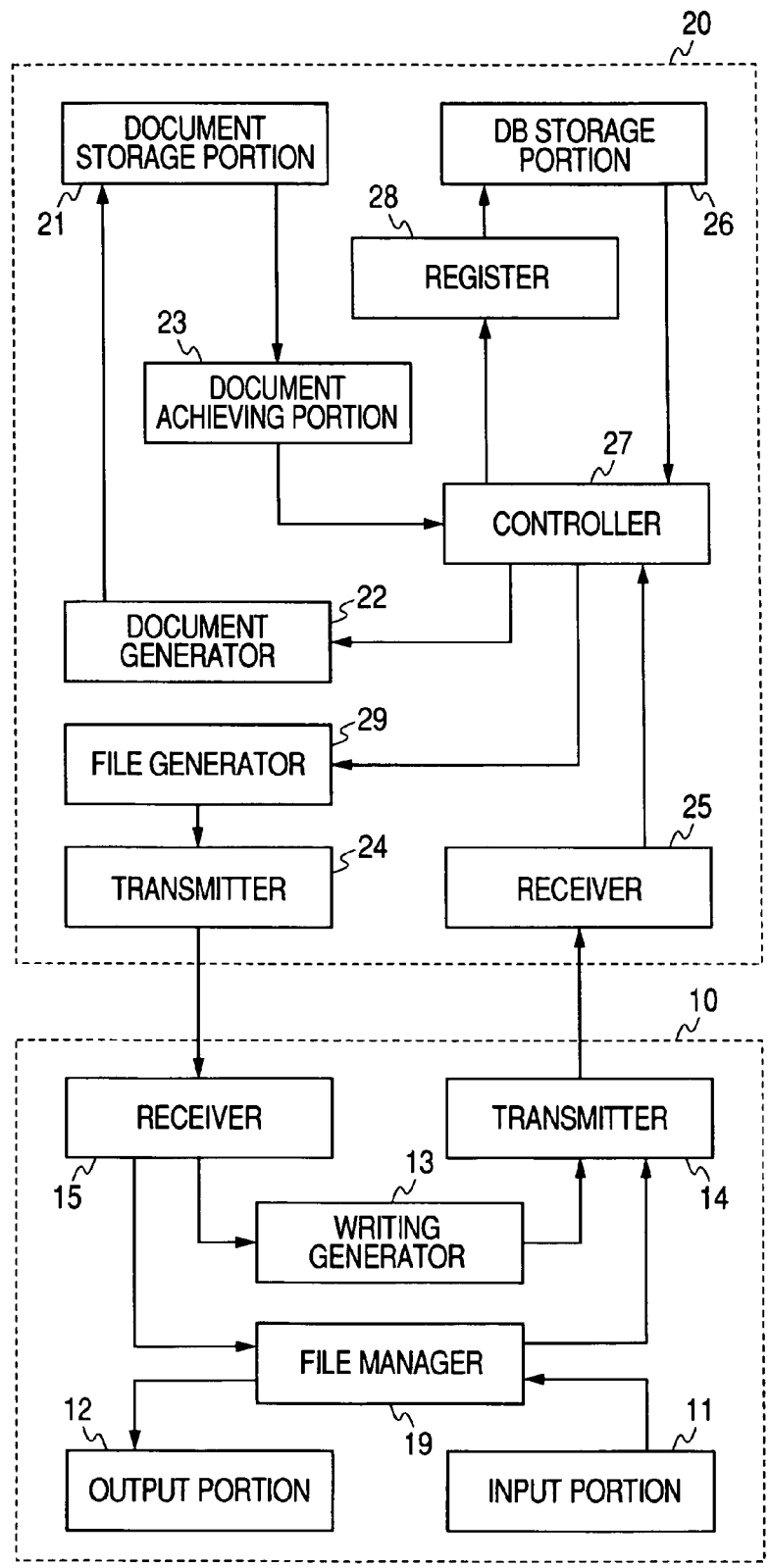
FIG. 14 is a block diagram showing the configurations of a terminal device and a document server for generation and use of the writing file in the second exemplary embodiment of the present invention.

FIG. 14 is a diagram showing the functional configuration of the terminal device 10 and the document server 20. The terminal device 10 and the document server 20 also have the function of generating the print document 50. However, only the function to generate and use the writing file is shown in FIG. 14.

As shown in FIG. 14, the terminal device 10 is equipped with an input part 11, an output part 12, a writing generator 13, a transmitter 14, a receiver 15 and a file manager 19.

The input part 11 inputs a password set to a writing file, and the output part 12 outputs an electronic document acquired by operating the writing file. The writing generator 13 generates writing information on the basis of position information acquired from the electronic pen 60. The transmitter 14 transmits identification information, writing information, a password, a request for achieving an electronic document, etc. The receiver 15 receives identification information and position information from the electronic pen 60, also receives a writing file and an electronic document from the document server 20. The file manager 19 stores the writing file into a storage device (not shown) and manages the writing file. The writing generator 13 functions as a writing information achieving unit because it generates the writing information.

These functional portions are implemented by the cooperation between the software and hardware resources. Specifically, CPU (not shown) of the terminal device 10 reads programs for implementing the respective functions of the input part 11, the output part 12, the writing generator 13, the transmitter 14, the receiver 15 and the file manager 19 from an external storage device to the main storage device to execute the processing. Furthermore, the storage device for storing the writing files managed by the file manager 19 is implemented by a magnetic disk, for example.

Furthermore, the document server 20 is equipped with a document memory 21, a document generator 22, a document achieving part 23, a transmitter 24, a receiver 25, a DB memory 26, a controller 27, a register 28 and a file generator 29.

The document memory 21 stores electrical documents. The document generator 22 copies an electronic document stored in the document memory 21 to generate a new electronic document (copy document), and stores the new electronic document into the document memory 21. The document achieving part 23 reads out an electronic document stored in the document memory 21. The transmitter 24 transmits a writing file and an electronic document. The receiver 25 receives identification information, writing information, a password and a request for achieving an electronic document. The DB memory 26 stores a database in which identification information, the storage place of an electronic document and a pointer to a copy document are associated with one another. The controller 27 controls the operation of the whole of the document server 20, and the register 28 registers information into the database stored in the DB memory 26. The file generator 29 generates a writing file.

The receiver 25 receives the writing information, and thus it functions as a writing information achieving unit. Furthermore, the file generator 29 acquires link information (document ID) to the electronic document, and thus it functions as a link achieving unit.

These functional portions are implemented by the cooperation between the software and hardware resources. Specifically, CPU (not shown) of the document server 20 reads programs for implementing the respective functions of the document generator 22, the document achieving part 23, the transmitter 24, the receiver 25, the controller 27, the register 28 and the file generator 29 from an external storage device to the main storage device to execute the processing. Furthermore, the document memory 21 and the DB memory 26 are implemented by a magnetic disk, for example.

Next, the content of the database stored in the DB memory 26 of the document server 20 will be described in detail.

FIG. 15 shows an example of data in the database.

As shown in FIG. 15, the identification information, the storage place of the electronic document and the pointer to the copy document (hereinafter referred to as "pointer") are provided as items in the database.

In this exemplary embodiment, the identification information is the identification information (document ID) of each electronic document as described above.

The storage place of the electronic document is information (address information) indicating a place at which an electronic document printed on each medium is stored.

When a copy document of each electronic document is generated, the pointer indicates the identification information of the copy document concerned. Specifically, when the copy document is generated, the pointer to the generated copy document is stored in association with the original electronic document. For example, FIG. 15 shows that "aaa_01.xdw" is generated as a copy document of "aaa.xdw" managed by the first line. When no copy document is generated, "NULL" is stored as the pointer.

Next, the operation when the writing file is generated will be described.

Figure 16:
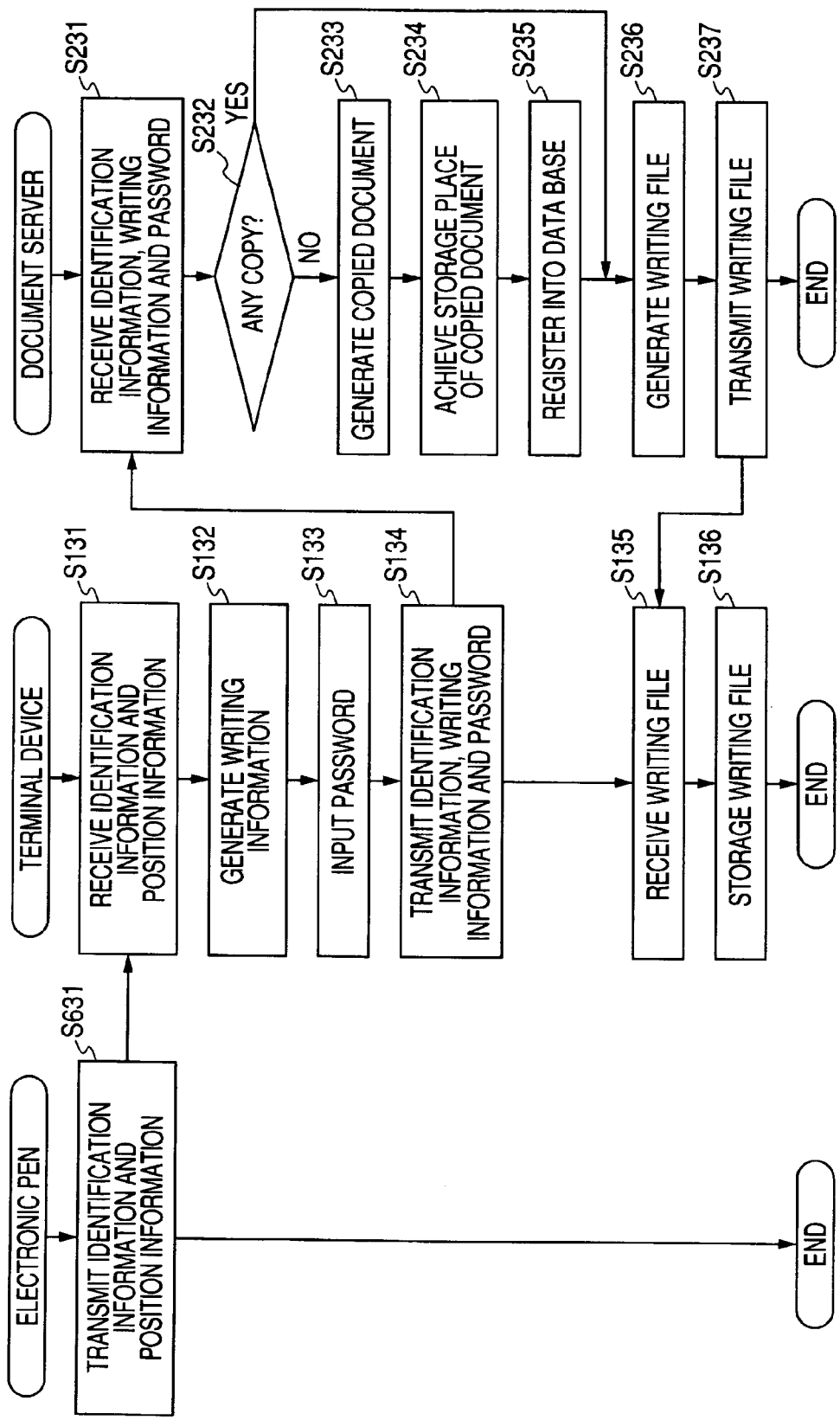
FIG. 16 is a sequence diagram for generation of the writing file in the second exemplary embodiment of the present invention.

FIG. 16 is a sequence diagram showing this operation.

First, the electronic pen 60 transmits to the terminal device 10 the identification information and the position information acquired through the processing of FIG. 6 (step 631).

At this time, in the terminal device 10, the receiver 15 receives the identification information and the position information, and delivers these information to the writing generator 13 (step 131).

Subsequently, the writing generator 13 generates the writing information on the basis of the position information out of the delivered information, and delivers the position information to the transmitter 14 (step 132). At this time, the writing information is generated on the basis of the position information indicating plural positions on the medium. When the position information received from the electronic pen 60 contains an error, the writing generator 13 may execute the processing as described with respect to the first exemplary embodiment to correct the position information.

The writing generator 13 directly delivers the identification information delivered from the receiver 15 to the transmitter 14.

At this time, the input part 11 inputs a password set to a writing file (step 133). For example, the terminal device 10 displays a dialog box on a display (not shown) in response to the generation of the writing information. The user may input a password into the dialog box, whereby the input part 11 inputs the password. The input password is delivered to the file manager 19. The password is subjected to encryption processing in the file manager 19, and then delivered to the transmitter 14.

Thereafter, the transmitter 14 transmits the identification information, the writing information and the password to the document server 20 (step 134).

Accordingly, in the document server 20, the receiver 25 receives the identification information, the writing information and the password, and delivers these information to the controller 27 (step 231). The controller 27 refers to the database stored in the DB memory 26, and judges whether the pointer corresponding to the received identification information is set to "NULL" (step 232). That is, it is judged whether a copy document of the electronic document has been already generated because writing is carried out on a medium on which the same electronic document is printed beforehand.

Here, when it is judged that the pointer is set to "NULL", that is, if it is judged that there is no copy document, the controller 27 instructs the document generator 22 to generate a copy document of the original electronic document. The document generator 22 generates the copy document (step 233).

When the copy document is generated as described above, the document generator 22 acquires the information on the storage place of the copy document (containing the file name), and delivers the information to the register 28 through the controller 27. The register 28 provides unused identification information to the copy document, and stores the association between the identification information and the copy document into the DB memory 26. Furthermore, the register 28 registers this identification information as the pointer to the copy document into DB memory 26 (step 235). In this case, the pointer is registered in association with the original electronic document. For example, it is assumed that writing has been carried out on a medium immediately after the first line of FIG. 13 is registered. Then, the line of "aaa_01.xdw" is registered and the identification information of "aaa_01.xdw" is registered as a pointer on the first line.

Thereafter, the file generator 29 generates a writing file (step 236). Furthermore, when it is judged in step 232 that the pointer is not set to "NULL", that is, when it is judged that there is a copy document, the file generator 29 generates the writing file without instructing generation of a copy document (step 236). The detailed content of the writing file will be described later, and it contains at least the password, the link information to the copy document and the writing information. The file generator 29 delivers the writing file to the transmitter 24, and the transmitter 24 transmits the writing file to the terminal device 10 (step 237).

Accordingly, in the terminal device 10, the receiver 15 receives the writing file (step 135). The receiver 15 delivers the writing file to the file manager 19, and the file manager 19 manages the writing file in a storage device (not shown) (step 136).

Here, the writing file generated through the above processing will be described.

Figure 17:
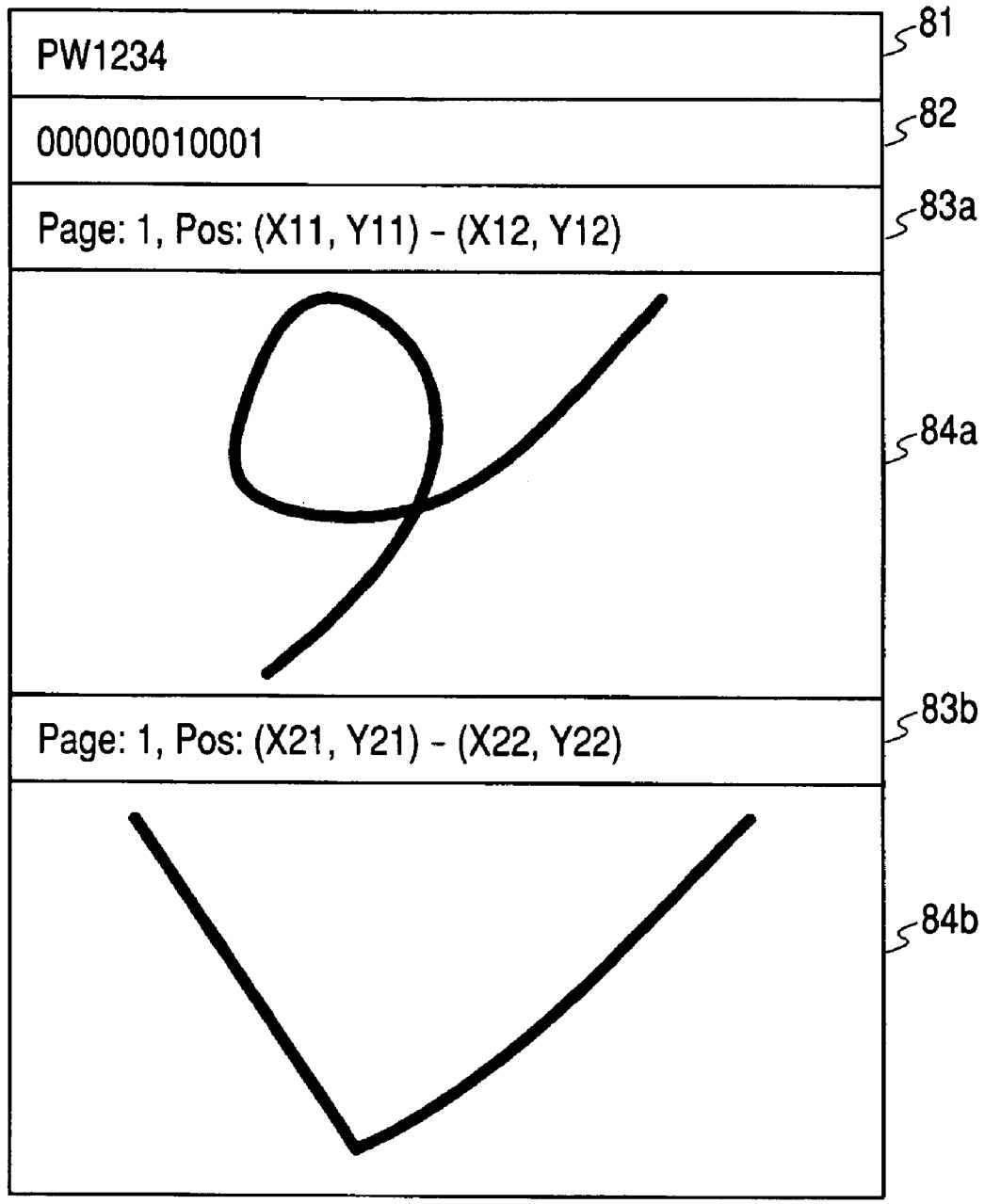
FIG. 17 is a diagram showing an example of the writing file generated in the second exemplary embodiment of the present invention.

FIG. 17 is a diagram showing an example of the writing file. In this case, a writing file generated when writing is carried out on the medium managed by the first line of FIG. 15 is shown.

As shown in FIG. 17, the writing file has a password area 81, a link information area 82, position information areas 83*a* and 83*b* and writing information areas 84*a* and 84*b*.

The information set in the password area 81, the position information areas 83*a* and 83*b* and the writing information areas 84*a* and 84*b* is the same as the first exemplary embodiment, and thus the description thereof is omitted.

In this exemplary embodiment, the link information to the copy document specified in step 232 or received in step 234 is set in the link information area 82. However, not the address information, but the document ID is set as the link information. That is, since it is assumed that writing is carried out on a medium on which "aaa.xdw" of the first line of FIG. 15 is printed, the document ID of the copy document thereof "aaa_01.xdw) is set.

Next, the operation of achieving an electronic document by operating the writing file as described above and displaying the electronic document while the writing information is superposed on the electronic document will be described.

Figure 18:
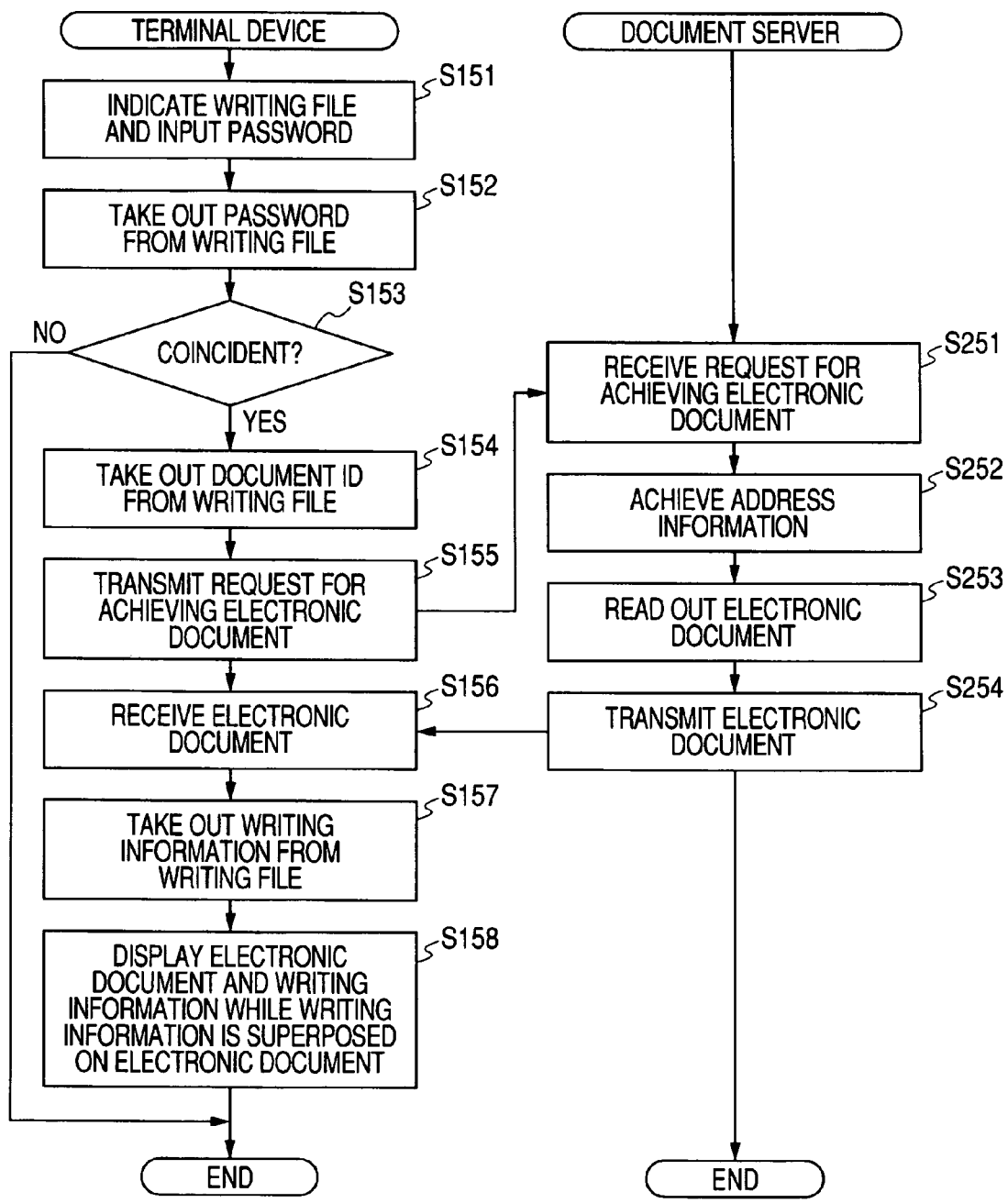
FIG. 18 is a sequence diagram for use of the writing file in the second exemplary embodiment in the present invention.

FIG. 18 is a flowchart showing this operation.

First, in the terminal device 10, the input part 11 inputs information indicating the writing file and a password, and delivers the information to the file manager 19 (step 151). For example, the user selects a desired writing file from a list of writing files managed by the file manager 19, and the input part 11 inputs the selected information. Subsequently, the terminal device 10 displays a dialog box on a display (not shown). Then, the user inputs a password into the dialog box, whereby the input part 11 inputs the password.

Subsequently, the file manager 19 takes out the password from the indicated writing file out of the writing files stored in a storage device (not shown) (step 152). Then, the file manager 19 judges whether the input password and the password taken out from the writing file are coincident with each other (step 153).

Here, if it is judged that both the passwords are not coincident with each other, it is considered that a use having no authority to use the writing file operates the terminal device 10, and thus the processing is finished with no action.

On the other hand, if it is judged that both the passwords are coincident with each other, it is considered that a user having authority to use the writing file operates the terminal device 10, and thus the processing is continued. That is, the file manager 19 takes out the document ID from the writing file and delivers it to the transmitter 14 (step 154). The transmitter 14 transmits to the document server 20 a request for achieving the electronic document corresponding to the document ID (step 155).

Accordingly, in the document server 20, the receiver 25 receives the achieving request and delivers it to the controller 27 (step 251). The controller 27 acquires the address information corresponding to the document ID from the DB memory 26, and delivers the address information to the document achieving part 23 (step 252). The document achieving part 23 read out the electronic document from the storage place indicated by the address information in the document memory 21, and delivers the electronic document to the transmitter 24 (step 253).

Thereafter, the transmitter 24 transmits the delivered electronic document to the terminal device 10 (step 254).

Accordingly, in the terminal device 10, the receiver 15 receives the electronic document and delivers it to the file manager 19 (step 156). At this time, the file manager 19 takes out the writing information from the writing file specified in step 151 (step 157). The taken-out writing information is superposed on the electronic document delivered in step 156 to generate a superposition image, and delivers the superposition image to the output part 12. The output part displays the superposition image on a display (not shown) (step 158).

In the above-described exemplary embodiment, if a copy document is generated because writing is carried out beforehand on the same medium, new writing information is added to the link information to the existing copy document to generate the writing file. Many variations may be considered for the above method.

First, there is a method of inquiring of the user about which electronic document should be selected to add new writing information to the link information to the selected electronic document. Alternatively, when it has been already determined at the print time which electronic document should be selected to add the new writing information to the link information to the selected electronic document, indication information for indicating the electronic document to be selected may be embedded as a part of the code pattern image in the medium. In this case, when the electronic pen 60 acquires the identification information and the position information from the code pattern image, the electronic pen 60 also acquires this indication information, and transmits it to the document server 20. In the document server 20, the writing information is added to the link information to the electronic document specified on the basis of the indication information to generate the writing file.

Furthermore, in this exemplary embodiment, the document ID is set as the link information. However, the address information may be set as in the case of the first exemplary embodiment. In this case, when the user operates the writing file, the document server 20 can immediately read out and transmit the target electronic document without converting the document ID to the address information.

Furthermore, in this exemplary embodiment, it is assumed that the document ID is provided as the identification information of the electronic document to be embedded in the medium. However, the address information may be embedded in the medium. This configuration enables generation of a writing file with which the electronic document can be immediately acquired by directly using the address information read out from the medium without searching the database.

Furthermore, the copy document is generated from the original electronic document and the writing information is added to the link information to the copy document concerned. However, the writing information may be added to the link information to the original electronic document to generate the writing file.

As described above, this exemplary embodiment is configured so that the writing file in which the link information to the electronic document and the writing information are integrated with each other is generated. This configuration can increase the level of convenience when the writing information is treated. That is, each individual who makes writings on a print document derived from an electronic document can manage his/her writing information by himself/herself. Therefore, the user can treat the electronized writing information as if he/she treats paper.

Furthermore, this exemplary embodiment is configured so that the association between the electronic document and the writing information is not managed by the server, whereby no complicate management in the server is required and the writing information can be moved on a file basis. That is, information sharing based on copies and electronic mails can be easily performed. In addition, the complicated management in the server is not required, so that the processing load imposed on the server can be reduced.

Still furthermore, there is adopted neither the configuration that the writing information is held in the server nor the configuration that the writing information is pursued from the information managed in the server. Accordingly, writing information which is not desired to be laid open can be easily made secret. In addition, the access to electronic documents is controlled in the server level (or file level), however, the access to writing information is controlled in the file level. Accordingly, even when a user having no authority to access an electronic document acquires a writing file, an unauthorized access to the electronic document can be prevented by the access control function of the server because the entity of the electronic document is stored in the server. Furthermore, flexible security to writing information can be ensured.

The first and second exemplary embodiments of the invention are described above. In the above-described exemplary embodiments, it is assumed that a copy document of an electronic document is generated at the timing at which writings are made on a medium. This is because the effective use of the hardware resource can be performed by preventing occurrence of an electronic document that is printed, but provided with no writing. However, a copy document of an electronic document may be generated at the timing at which the electronic document is printed on a medium. In such a configuration, it is unnecessary to store all the print parameters when an electronic document is printed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chose and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A writing information processing device that processes digitized writing information where the writing information is provided on a medium having a document image, comprising:
    a writing acquiring unit that acquires writing information written on the medium that is separate from the document image printed on the medium;
    an image input unit that receives a code pattern image printed on the medium, wherein identification information and position information are embedded in the code pattern image;
    a position acquiring unit that acquires the position information from position code in the code pattern image, the location of the position code in the code pattern image is determined based on a positional relationship between the position code and a synchronous code in the code pattern image;
    a link acquiring unit that acquires at least one link information that links the document image to a first electronic document, or another link information that links a second electronic document generated from the first electronic document to the first electronic document, wherein the link information is determined from the identification information; and
    a file generating unit that generates a file in which the writing information is added to the link information.

2. The writing information processing device according to claim 1, wherein the writing acquiring unit generates the writing information from a plurality of position information.

3. The writing information processing device according to claim 1, further comprising:
    a transmitting unit that transmits the file generated by the file generating unit to another device.

4. The writing information processing device according to claim 1, further comprising:
    a receiving unit that receives the identification information of at least one of the first electronic document and the second electronic document from another device;
    an address acquiring unit that acquires address information indicating a storage place of the first electronic document or the second electronic document on the basis of the identification information received from the receiving unit; and
    a transmitting unit that transmits the address information acquired from the address acquiring unit to the another device.

5. The writing information processing device according to claim 1, further comprising:
    a receiving unit that receives identification information of at least one of the first electronic document and the second electronic document from another device;
    a document acquiring unit that acquires at least one of the first electronic document and the second electronic document on the basis of the identification information received from the receiving unit; and
    a transmitting unit that transmits at least one of the first electronic document and the second electronic document acquired by the document achieving unit to the another device.

6. The writing information processing device according to claim 1, wherein the link information further includes an address information indicating a storage place of the first electronic document or the second electronic document.

7. The writing processing device according to claim 1, further comprising:
    a document generating unit that generates the second electronic document in synchronization with print of the document image on the medium.

8. The writing information processing device according to claim 1, further comprising:
    a document generating unit that generates the second electronic document after the writing acquiring unit acquires the writing information.

9. The writing information processing device according to claim 1, further comprising:
    a document generating unit that generates the second electronic document by converting the format of the first electronic document so that the content of the first electronic document cannot be edited.

10. A writing information processing method that processes digitized writing information where the writing information is provided on a medium having a document image, comprising:
    acquiring writing information written on the medium that is separate from the document image formed on the medium;
    receiving a code pattern image printed on the medium, wherein identification information and position information are embedded in the code pattern image;
    determining the location of position code in the code pattern image based on a positional relationship between position code and synchronous code in the code pattern image;
    acquiring the position information from the position code in the code pattern image;
    acquiring at least one link information that links the document image to a first electronic document or another link information that links a second electronic document generated from the first electronic document to the first electronic document, wherein the link information is determined from the identification information; and
    generating a file in which the writing information is added to the link information.

11. The writing information processing method according to claim 10, further comprising:
    transmitting the generated file to another device.

12. The writing information processing method according to claim 10, further comprising:
    acquiring identification information of the medium from the medium; and
    reading association information between the identification information of the medium and the link information to the electronic document from a storage device, the electronic document being the original to the document image printed on the medium, wherein the link information is acquired by searching the association information on the basis of the acquired identification information.

13. The writing information processing method according to claim 10, further comprising:
acquiring identification information of the first electronic document from the medium; and
reading association information between the identification information of the electronic document and the address information indicating the storage place of the electronic document from a storage device that the association information is stored, wherein in acquiring the link information, the address information is acquired as the link information by searching the association information on the basis of the acquired identification information.

14. The writing information processing method according to claim 10, further comprising:
acquiring address information indicating a storage place of the first electronic document from the medium, wherein the link information further includes the address information.

15. The writing information processing method according to claim 10, further comprising:
acquiring identification information of the medium from the medium;
reading association information between the identification information of a medium and a print parameter used for printing the document image from a storage device that the association information is stored;
acquiring the print parameter by searching the association information on the basis of the acquired identification information; and
generating the second electronic document by converting the first electronic document to a print image using the acquired print parameter.

16. A computer readable medium storing a program causing a computer to process digitized writing information where the writing information is provided on a medium having a document image the process comprising:
acquiring the writing information written on the medium that is separate from the document image printed on the medium;
receiving a code pattern image printed on the medium, wherein identification information and position information are embedded in the code pattern image;
determining the location of position code in the code pattern image based on a positional relationship between position code and synchronous code in the code pattern image;
acquiring the position information from the position code in the code pattern image;
acquiring at least one link information that links the document image to a first electronic document, or another link information that links a second electronic document generated from the first electronic document to the first electronic document, wherein the link information is determined from the identification information; and
generating a file that the writing information is added to the link information.

17. The computer readable medium according to claim 16, wherein the process further includes transmitting the generated file to another device.

* * * * *